(12) United States Patent
Salman

(10) Patent No.: US 12,394,319 B1
(45) Date of Patent: Aug. 19, 2025

(54) AIRPORT MANAGEMENT SYSTEM WITH GATE PERFORMANCE UI AND RELATED METHODS

(71) Applicant: Synaptic Aviation Inc., Coral Gables, FL (US)

(72) Inventor: Salman Salman, Coral Gables, FL (US)

(73) Assignee: SYNAPTIC AVIATION INC., Coral Gables, FL (US)

(*) Notice: Subject to any disclaimer, the term of this patent is extended or adjusted under 35 U.S.C. 154(b) by 385 days.

(21) Appl. No.: 18/049,467

(22) Filed: Oct. 25, 2022

(51) Int. Cl.
*G08G 5/22* (2025.01)
*G06F 3/0482* (2013.01)
*G06V 10/25* (2022.01)
*G06V 10/70* (2022.01)
*G06V 20/54* (2022.01)
*G08G 5/51* (2025.01)

(52) U.S. Cl.
CPC ............ *G08G 5/22* (2025.01); *G06F 3/0482* (2013.01); *G06V 10/25* (2022.01); *G06V 10/70* (2022.01); *G06V 20/54* (2022.01); *G08G 5/51* (2025.01)

(58) Field of Classification Search
CPC ............ G08G 5/22; G08G 5/51; G06V 10/25; G06V 10/70; G06V 20/54; G06F 3/0482
See application file for complete search history.

(56) References Cited

U.S. PATENT DOCUMENTS

| | | | |
|---|---|---|---|
| 6,542,086 B2 | 4/2003 | Baumgartner et al. | |
| 9,862,501 B2 | 1/2018 | Small et al. | |
| 9,934,693 B2 | 4/2018 | Joyson et al. | |
| 9,950,812 B2 | 4/2018 | Agrawal | |
| 10,296,860 B2 | 5/2019 | Agrawal et al. | |
| 10,592,749 B2 | 3/2020 | Coppock et al. | |
| 11,006,078 B1 | 5/2021 | Patel et al. | |
| 11,142,306 B2 | 10/2021 | Cox et al. | |
| 11,151,491 B2 | 10/2021 | Basanets et al. | |
| 2012/0194358 A1* | 8/2012 | Alon | G08G 5/0026 340/945 |
| 2013/0329052 A1* | 12/2013 | Chew | G08G 5/51 348/159 |

(Continued)

FOREIGN PATENT DOCUMENTS

| | | | | |
|---|---|---|---|---|
| CN | 110807525 A | * | 2/2020 | ........... G06N 3/0454 |
| WO | WO2019186594 | | 10/2019 | |

OTHER PUBLICATIONS

Lu, et al., Airport Gate Operation Monitoring Using Computer Vision Techniques, 16th AIAA Aviation Technology, Integration, and Operations Conference, p. 3912 (2016) (Year: 2016).*

*Primary Examiner* — Charles Guiliano
(74) *Attorney, Agent, or Firm* — Allen, Dyer, Doppelt + Gilchrist, PA

(57) ABSTRACT

An airport management system is for an airport with gates. The airport management system includes a server, and image sensors respectively at the gates. Each image sensor is configured to generate image data for an apron of a respective gate. The server is configured to receive the image data from each of the image sensors, detect objects and apron events within the apron of the respective gate based upon a machine learning model, and generate a gate performance UI for viewing the detected objects and the detected apron events. The gate performance UI includes a timeline menu of the detected apron events for each respective gate.

20 Claims, 26 Drawing Sheets

(56) References Cited

U.S. PATENT DOCUMENTS

| | | | |
|---|---|---|---|
| 2018/0012499 A1* | 1/2018 | Madhusudan | G08G 5/727 |
| 2020/0377232 A1 | 12/2020 | Gonzalez Parra et al. | |
| 2022/0172592 A1* | 6/2022 | Hough | G06V 20/40 |

* cited by examiner

*FIG. 11E*

AIRPORT MANAGEMENT SYSTEM WITH GATE PERFORMANCE UI AND RELATED METHODS

TECHNICAL FIELD

The present disclosure relates to the field of airport monitoring, and, more particularly, to an airport management system for gate performance and related methods.

BACKGROUND

Airports are critical hubs for transportation in modern society. Indeed, every airport comprises many entities working together to receive and process aircraft. Pre-COVID, there were annually over 40 million flights worldwide. Due to the scale of the effort, there is a desire to enhance time efficiency throughout the airport. Of course, there is also a wide range of regulatory rules that must be adhered to for maintaining safe air service. For airline operators, this is a delicate balance since safety cannot be compromised, and the typical customer is notoriously price sensitive.

In early approaches, statistics for flight performance were cataloged manually. For example, the data would indicate that a certain percentage of flights were late for a gate, but there would be no context for why the delays occurred. Moreover, these approaches may provide no input on compliance with required procedure, for example, required foreign object debris (FOD) walks.

SUMMARY

Generally, an airport management system is for an airport with a plurality of gates. The airport management system comprises a server, and a plurality of image sensors respectively at the plurality of gates. Each image sensor is configured to generate image data for an apron of a respective gate. The server is configured to receive the image data from each of the plurality of image sensors, detect a plurality of objects and a plurality of apron events associated therewith and within the apron of the respective gate based upon a machine learning model, and generate a gate performance user interface (UI) for viewing the detected plurality of objects and the detected plurality of apron events. The gate performance UI comprises a timeline menu of the detected plurality of apron events for each respective gate.

More specifically, the gate performance UI may comprise a video menu, and the server may be configured to, when a given detected apron event is selected in the timeline menu, generate the video menu to comprise a video associated with the given detected apron event. The video menu may comprise a plurality of boundary boxes respectively over the detected plurality of objects in the video associated with the given detected apron event, and a plurality of confidence values respectively for the plurality of boundary boxes.

Also, the timeline menu may comprise a duration indicator for each of the detected plurality of apron events. The server may be configured to generate an airport performance UI for viewing the detected plurality of objects and the detected plurality of apron events for the plurality of gates. The airport performance UI may include a gate performance menu comprising, for each gate, a number and a length of air traffic holdouts, a number of early arrivals, a passenger loading bridge extension delay, and a gate utilization metric. The airport performance UI may comprise a dashboard menu comprising a number of flights for the airport, an average turn time for the airport, a gate utilization metric, and an on-time arrival metric.

The airport performance UI may comprise an event performance menu comprising average time durations for each type of detected apron events. The airport performance UI may comprise a compliance menu comprising compliance metrics for a plurality of user-defined safety rules for the plurality of gates. The detected plurality of apron events may include a Foreign Object Debris (FOD) walk, a ground power unit connection, a fuel hose connection, a belt loader connection, a passenger loading bridge connection, and a cargo event, for example. In some embodiments, each gate may have a single image sensor configured to generate the image data. In other embodiments, each gate may have a plurality of image sensors configured to generate the image data.

Another aspect is directed to a method for management of an airport with a plurality of gates. The method comprises operating a plurality of image sensors respectively at the plurality of gates, each image sensor configured to generate image data for an apron of a respective gate. The method further includes operating a server to receive the image data from each of the plurality of image sensors, detect a plurality of objects and a plurality of apron events associated therewith and within the apron of the respective gate based upon a machine learning model, and generate a gate performance UI for viewing the detected plurality of objects and the detected plurality of apron events. The gate performance UI comprises a timeline menu of the detected plurality of apron events for each respective gate.

BRIEF DESCRIPTION OF THE DRAWINGS

Figure 11E:
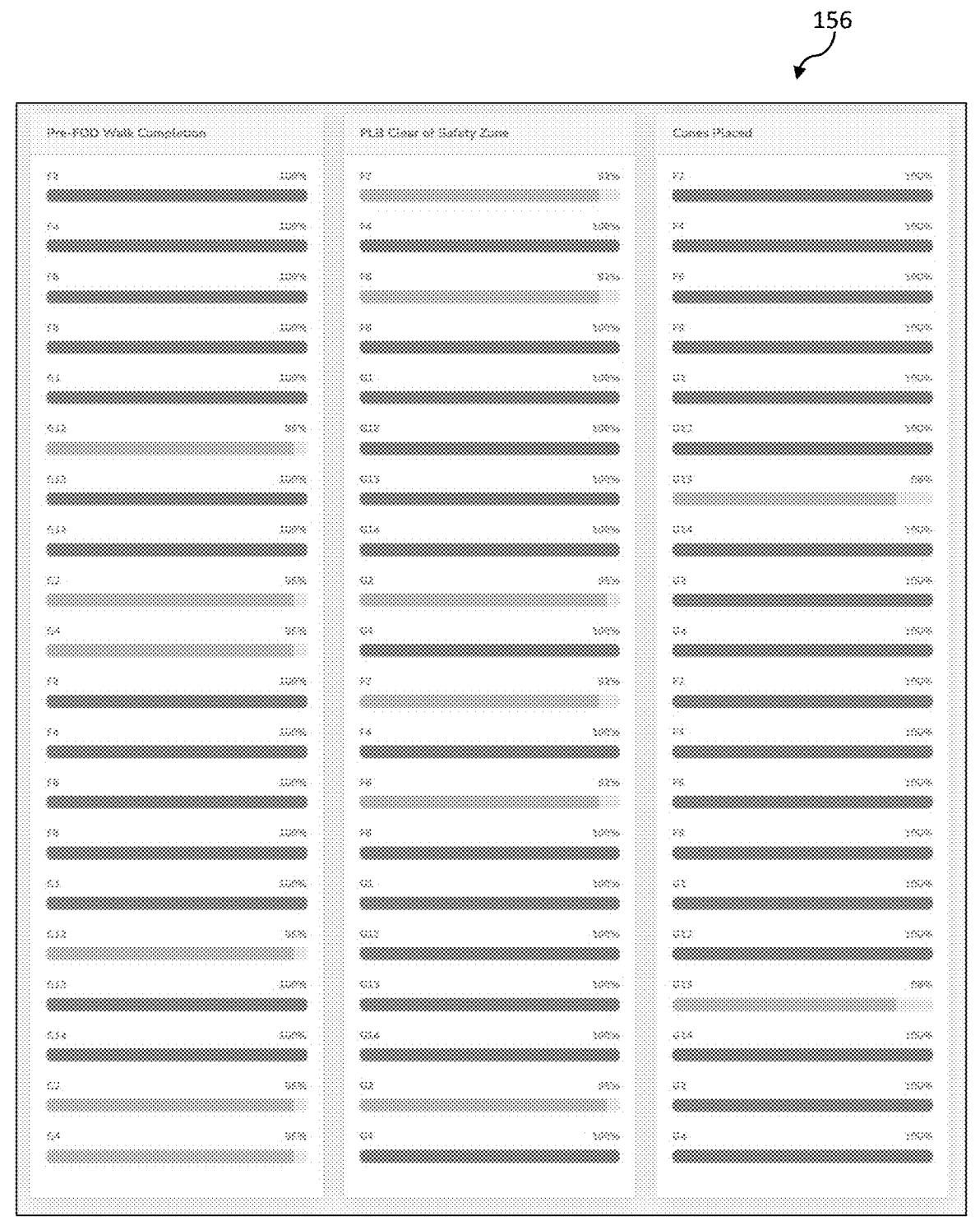

FIGS. 11A-11E are screenshots of an airport performance UI from the airport management system of FIG. 1.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Figure 1:
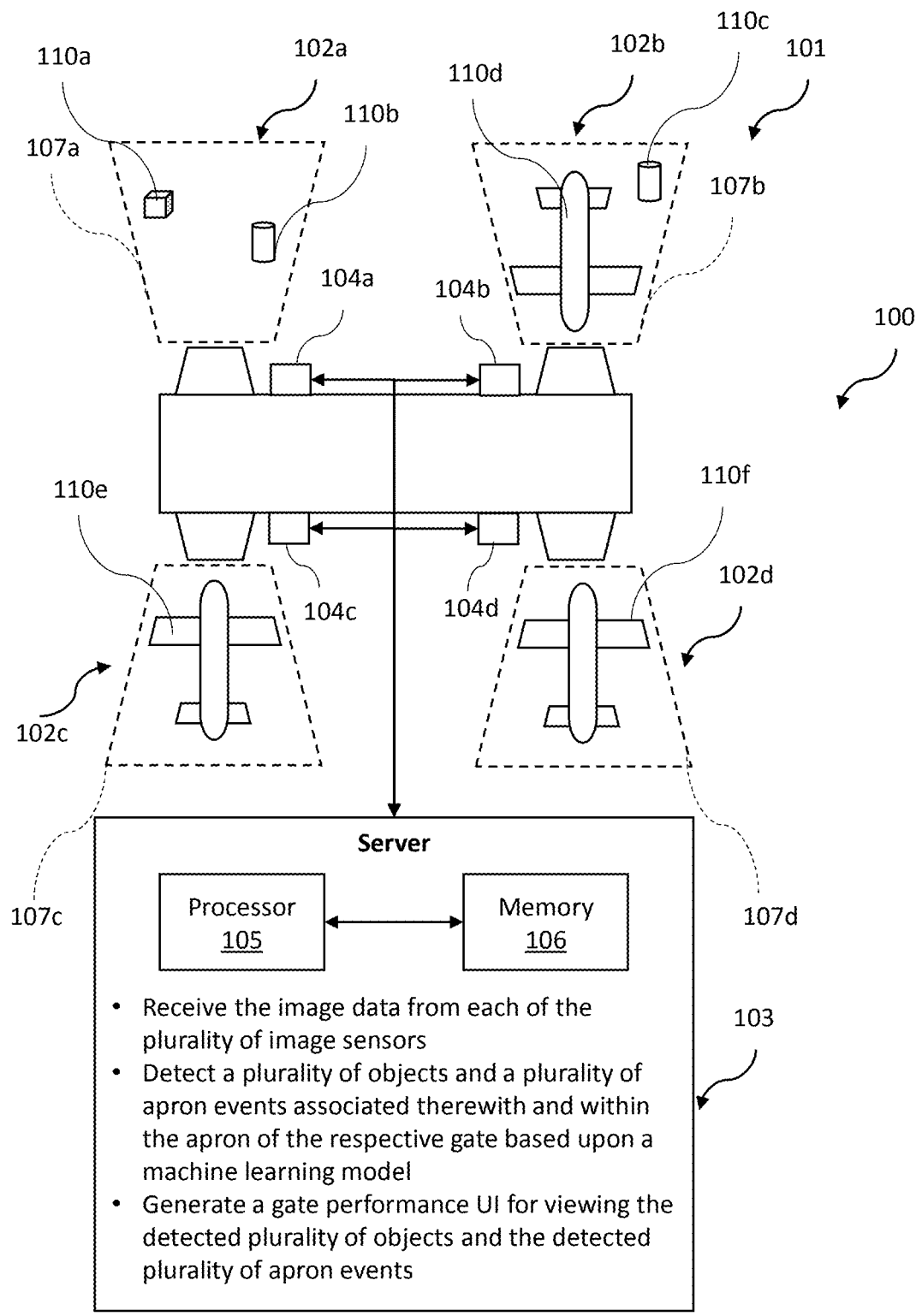
FIG. 1 is a schematic diagram of a first embodiment of an airport management system, according to the present disclosure.
Figure 2A:
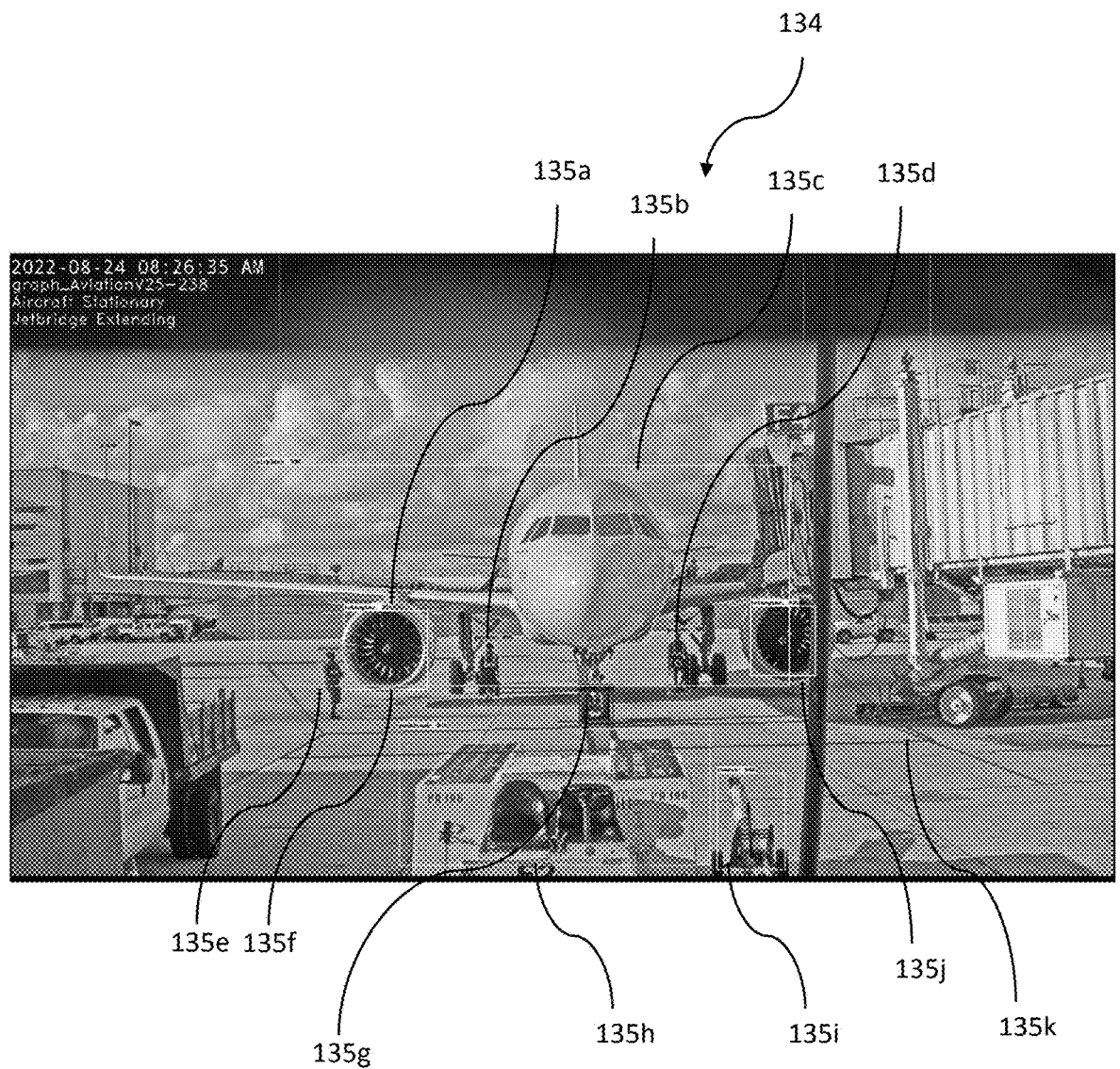
FIG. 2A is a screenshot of a video menu from a gate performance UI from the airport management system of FIG. 1.
Figure 2B:
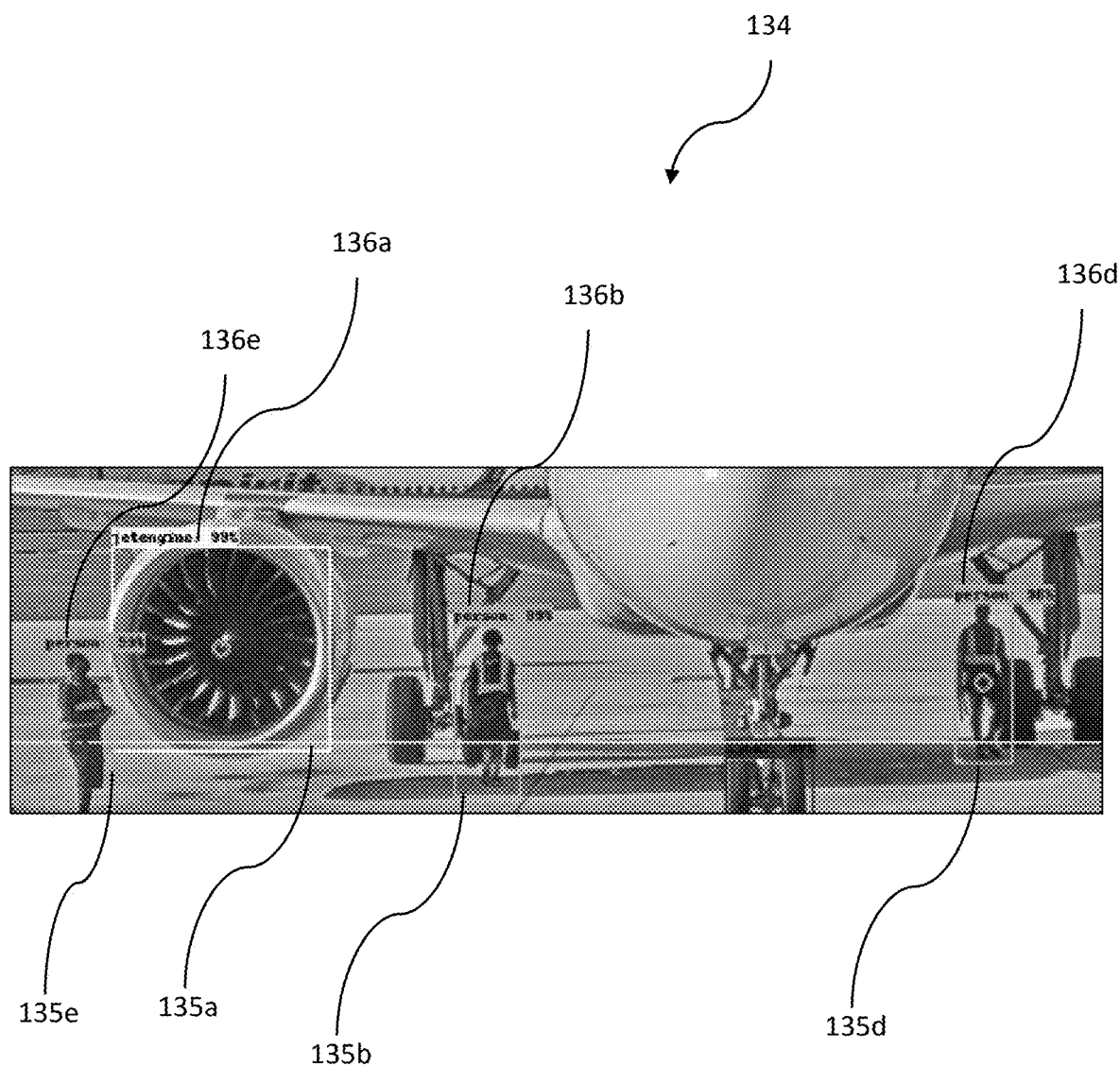
FIG. 2B is an enlarged screenshot of the video menu of FIG. 2A.

Referring initially to FIGS. 1 & 2A-2B, an airport management system 100 is for an airport 101 with a plurality of gates 102a-102d. For drawing clarity, only one airport 101 and four gates are depicted 102a-102d, but it should be appreciated that the airport management system 100 may be deployed in multiple airports and in a large number of gates in some embodiments.

The airport management system 100 comprises a server 103, and a plurality of image sensors 104a-104d (e.g. infrared capable video sensors, visible light spectrum cameras) respectively positioned at the plurality of gates and communicatively coupled to the server (e.g. via a local area network (LAN), or the Internet). The server 103 illustratively includes a processor 105 and a memory 106 coupled thereto. As will be appreciated by the skilled person, the server 103 may comprise a stand-alone computing device, a distributed computing network, or provisioned resources within a cloud computing platform (e.g. Amazon Web Services, Microsoft Azure).

Also, each of the plurality of image sensors 104a-104d may comprise a high resolution video sensor (e.g. 4k or 8k resolution). Each image sensor 104a-104d is configured to generate image data for an apron 107a-107d (i.e. the safety envelope-proper position of an aircraft) of a respective gate 102a-102d. In particular, the image data may comprise video data, and/or a sequence of image data frames with a known capture frequency. In some embodiments, each gate 102a-102d may have a single image sensor configured to generate the image data. In other embodiments, each gate 102a-102d may have a plurality of image sensors for provide multiple views of the apron 107a-107d and adjacent areas. In yet other embodiments, each gate 102a-102d may include an image sensor 104a-104d configured to monitor passenger traffic within a passenger loading bridge (i.e. a jet way).

The server 103 is configured to receive the image data from each of the plurality of image sensors 104a-104d. The image data from each of the plurality of image sensors 104a-104d may be transmitted to the server 103 in batches on a periodic schedule, or in advantageous embodiments, streamed in real-time. The server 103 is configured to detect a plurality of objects 110a-110n and a plurality of apron events associated with the plurality of objects and within the apron 107a-107d of the respective gate 102a-102d based upon a machine learning model. In the illustrated image data of FIGS. 2A-2B & 8A-8B, the plurality of objects 110a-110f comprises a safety envelope of the apron 107a-107d, an aircraft, aircraft engines, gate personnel, an aircraft tug device, a tow bar, service vehicles, aircraft landing gear, and a passenger bridge.

In some embodiments, the server 103 may comprise a plurality of devices. For example, the plurality of devices may comprise a machine learning computing device (e.g. computing cluster of one or more processing units, such as graphics processing units) configured to operate the machine learning model, and a database device configured to store image data associated with the detected events and the detected objects. Helpfully, due to bandwidth concerns at airport, the machine learning computing device may be locally deployed at the airport in some embodiments, and the database device may be located remote to the airport, such as within a cloud computing platform. Of course, in some embodiments, both the machine learning computing device and the database computing device may be located at the airport. While the plurality of image sensors 104a-104d is configured to stream their image data to the server 103 (i.e. the machine learning computing device) in real time in some embodiments, the machine learning computing device is configured to periodically upload the image data associated with the detected events and the detected objects to the database device in batches. Of course, the image data associated with the detected events and the detected objects could be streamed in real time, but this may consume bandwidth at the airport 101.

In embodiments where each gate 102a-102d includes a plurality of image sensors 104a-104d for providing multiple views of the apron 107a-107d, the server 103 may comprise a plurality of machine learning computing devices, each assigned to a subset of the plurality of gates 102a-102d. In some embodiments, the machine learning model comprises a TensorFlow artificial intelligence engine. As will be appreciated by the skilled person, the machine learning model must be trained. The machine learning model and its source code are then configured uniquely to each individual gate camera. In particular, once a respective image sensor 104a-104d is positioned, the apron 107a-107d (safety envelope) is annotated within the vision input of the image sensor. In some applications, there is additional training required for gate specific equipment. For example, if a fuel truck hose attachment mechanism is unique to a gate, the machine learning model must be trained to recognize the unique piece of equipment. In some applications, the angle of the position for the respective image sensor 104a-104d is canted or perhaps at a different elevation. Again, the machine learning model may be trained to accommodate the gate specific feature.

In the illustrated embodiment, the machine learning model utilizes one camera, which faces the apron 107a-107d. Once the machine learning model is successfully configured and connected to one of the plurality of image sensors 104a-104d, a computer vision system (e.g. OpenCV) is used to receive the video frames from each image sensor. The frames are processed by our machine learning model to determine objects 110a-110f and event detections. The machine learning model analyzes the movement of objects, which allows for the model to be agnostic to flight data information. Therefore, Federal Aviation Administration (FAA)/Airline Flight schedule data is not required for the machine learning model to determine event processing times and object detection. As each object is identified, the machine learning model passes the object detection level of confidence, the object identification, date/time values for acquisition, x-y coordinates of the object, and size of object information to a database stored in the server 103. Along with storing these data points, the machine learning model simultaneously uploads the corresponding images and videos (i.e. 1 minute snippets) associated with each significant object and event detection to the database.

Figure 3:
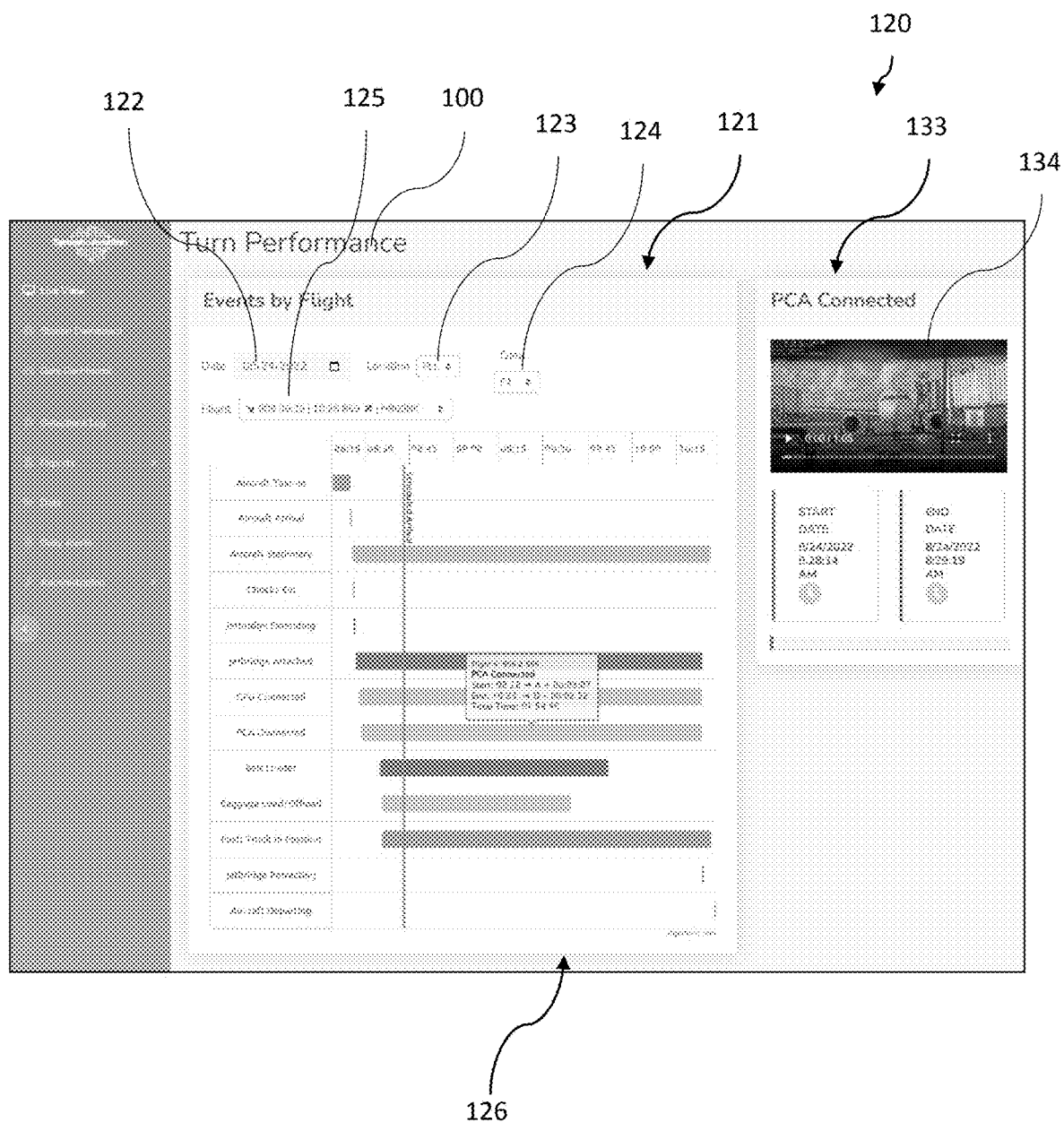
FIGS. 3-7 are screenshots of the gate performance UI from the airport management system of FIG. 1.
Figure 4:
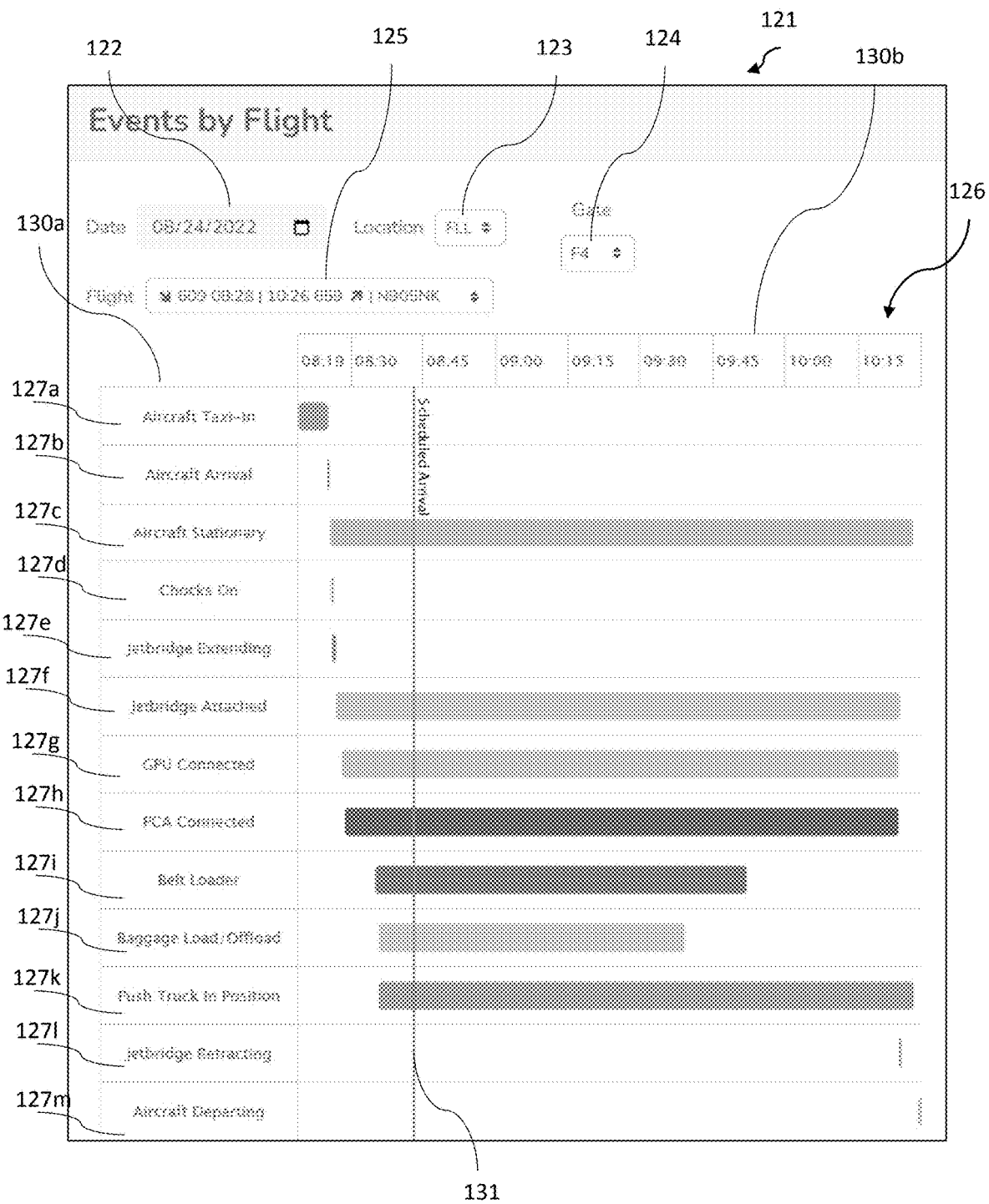

Referring now additionally to FIGS. 3-4, the server 103 is configured to generate a gate performance UI 120 for viewing the detected plurality of objects 110a-110f and the detected plurality of apron events. The gate performance UI 120 comprises a timeline menu 121 of the detected plurality of apron events for each respective gate 102a-102d. The timeline menu 121 illustratively includes a date fly down menu 122 for selecting a date for the gate performance statistics, a location fly down menu 123 for selecting the airport, a gate fly down menu 124 for selecting a gate, and a flight fly down menu 125 for selecting a flight.

The timeline menu 121 illustratively includes a two-dimensional timeline chart 126 having the apron events 127a-127m along the vertical axis 130a, and time along the horizontal axis 130b. Also, the timeline menu 121 may comprise a duration indicator (e.g. the illustrated horizontal bars) for each of the detected plurality of apron events 127a-127m, and a scheduled arrival indicator 131. Also, when a user selects any one of the detected plurality of apron events 127a-127m, the server 103 is configured to generate a context menu 132 providing additional data, for example, time duration, and start/end times. The detected plurality of apron events 127a-127m may include a Foreign Object Debris (FOD) walk, a ground power unit connection, a fuel hose connection, a belt loader connection, a passenger loading bridge extension/retraction/connection, a cargo event, an aircraft taxi-in, aircraft hold out, an aircraft arrival/departure, an aircraft being stationary, a placement of chocks on the aircraft, an aircraft tug device (i.e. push truck) being in position, for example.

In some embodiments, the server 103 is configured to cooperate with a third party database, and correlate the data from the third party database with the detected events and the detected objects. For example, aircraft hold outs outside the view of the respective image sensor 104a-104d would not be detected by the server 103. In this instance, the server 103 is configured to monitor the movement of the aircraft from landing to approach of the gate 102a-102d via a third party database with geolocation coordinates of the aircraft.

Further, the gate performance UI 120 illustratively comprises a video menu 133, and the server 103 is configured to, when a given detected apron event 127h is selected in the timeline menu 121, generate the video menu to comprise a video associated with the given detected apron event. As illustrated in FIG. 3, the given detected apron event 127h comprises the precondition air (PCA) unit being connected. Here, the video menu 133 comprises a video 134 of the given detected apron event 127h.

Referring specifically to FIGS. 2A-2B, which shows the video 134 of the given detected apron event 127h, the video menu 133 comprises a plurality of boundary boxes 135a-135k respectively over the detected plurality of objects 110a-110f in the video associated with the given detected apron event. The video menu 133 also comprises a plurality of confidence values 136a-136k respectively for the plurality of boundary boxes. As will be appreciated, the plurality of confidence values 136a-136k represent the relative confidence of the machine learning model classification of the object 110a-110f.

Figure 5:
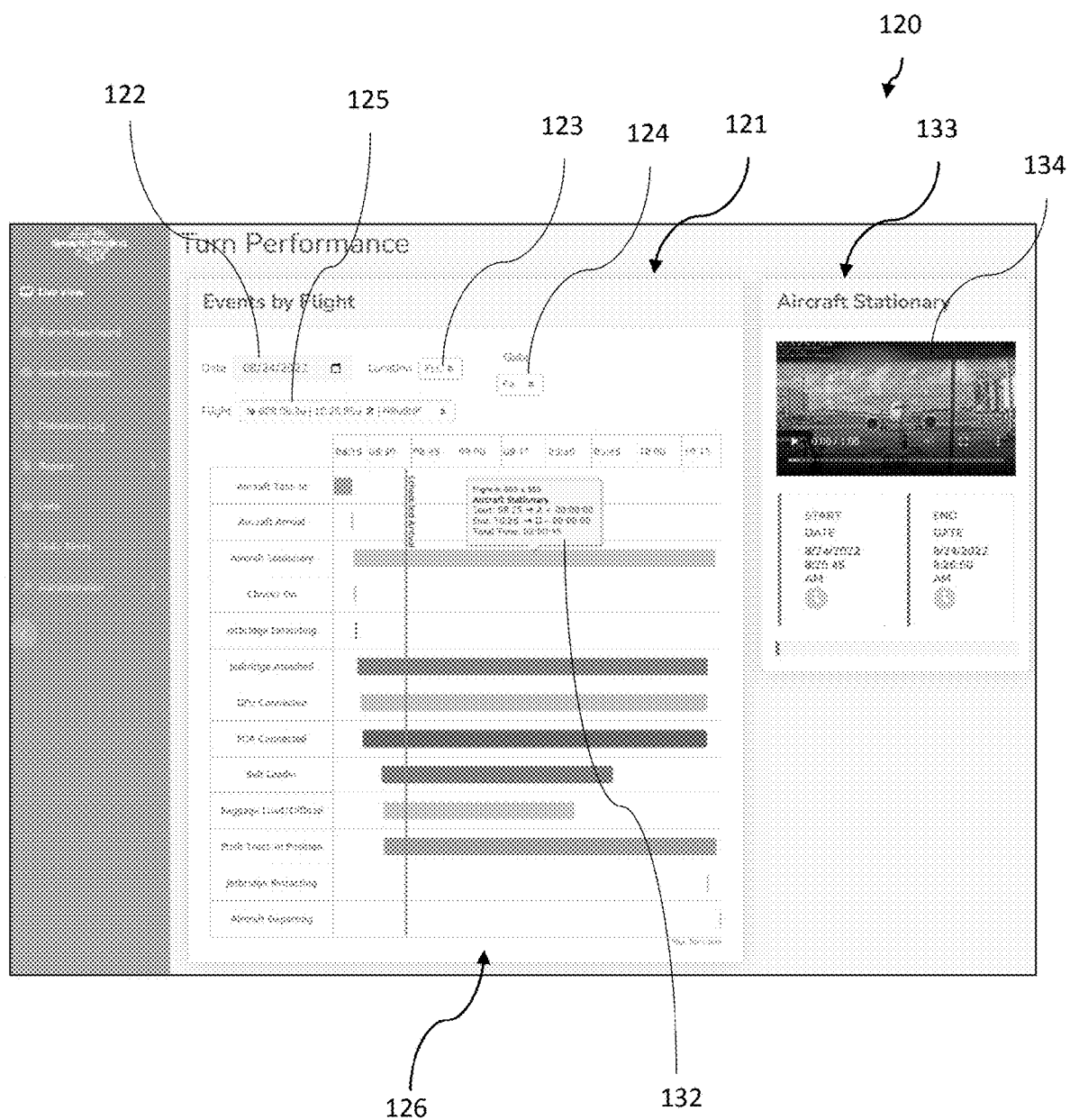
Figure 6:
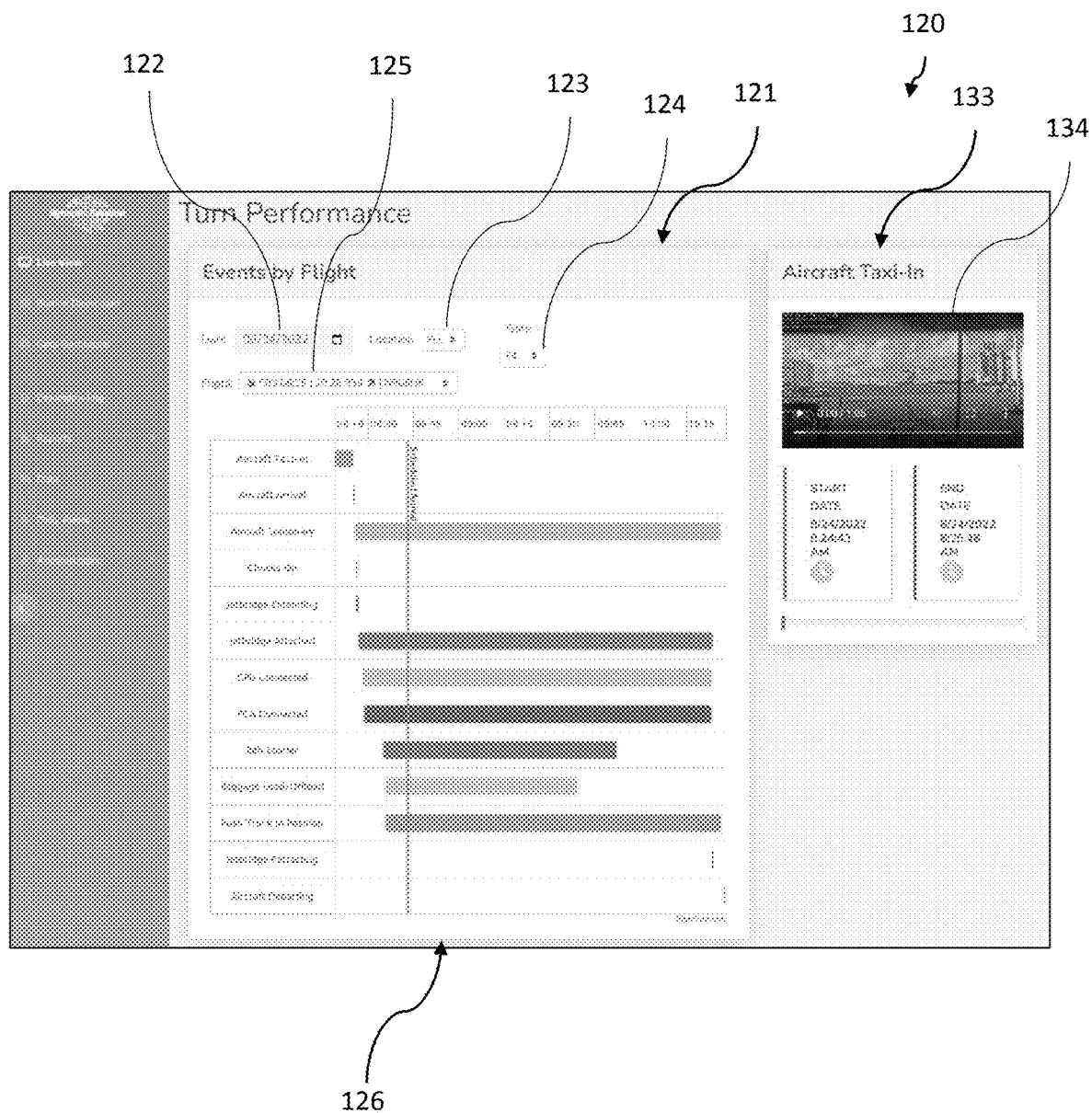

Referring now to FIG. 5, the gate performance UI 120 illustratively comprises a video menu 133 where the given detected apron event 127c comprises the aircraft being stationary. Helpfully, when the selected event is longer, for example, being greater than 2 hours in length, the video 134 of the given event is compressed (i.e. cut to a shorter length) to the initial portion of the given detected apron event 127c. In some embodiments, the video 134 of the given event is compressed to a 1 minute length video clip. Referring now to FIG. 6, the gate performance UI 120 illustratively comprises a video menu 133 where the given detected apron event 127a comprises the aircraft taxi-in.

Figure 7:
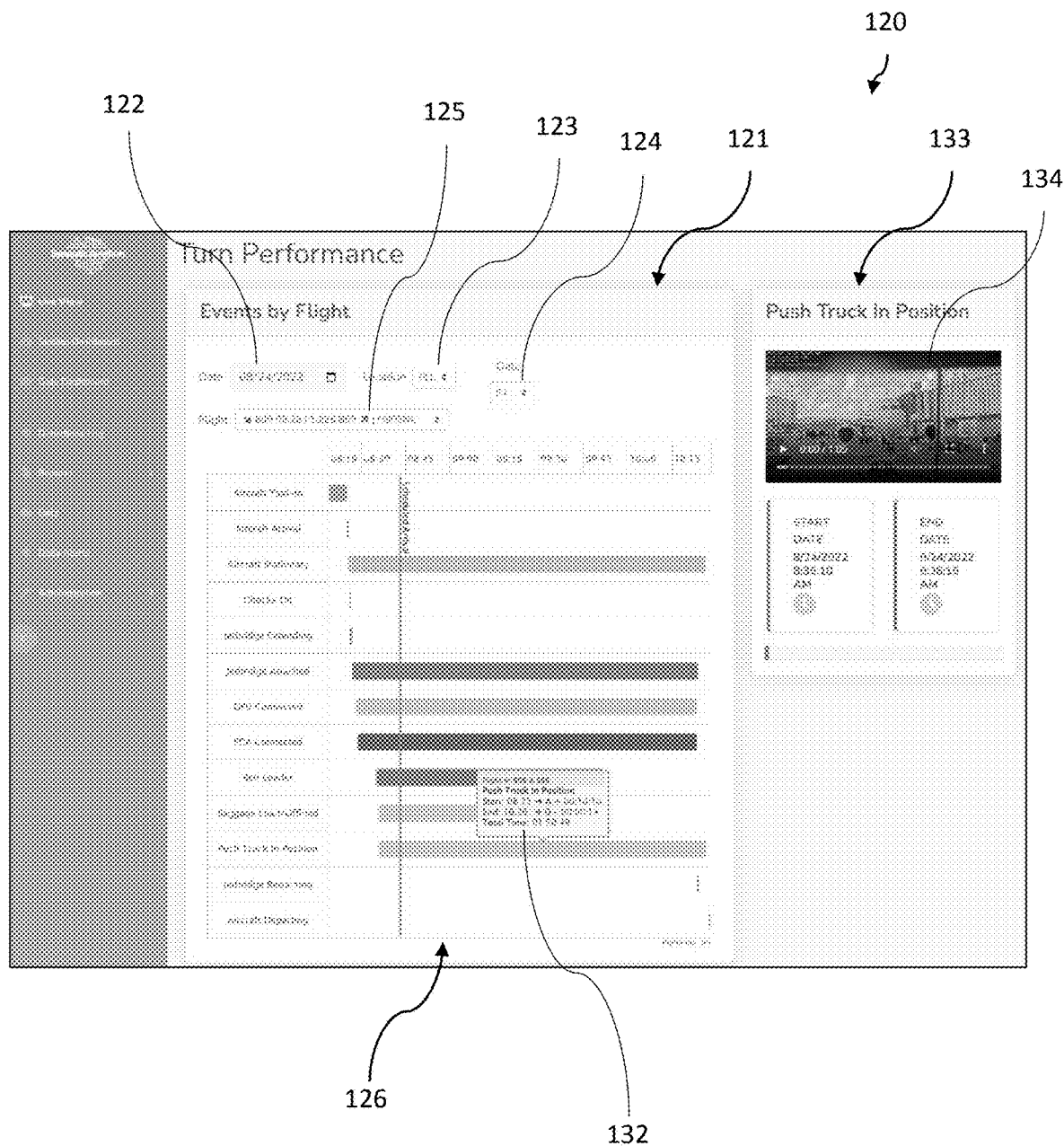
Figure 8A:
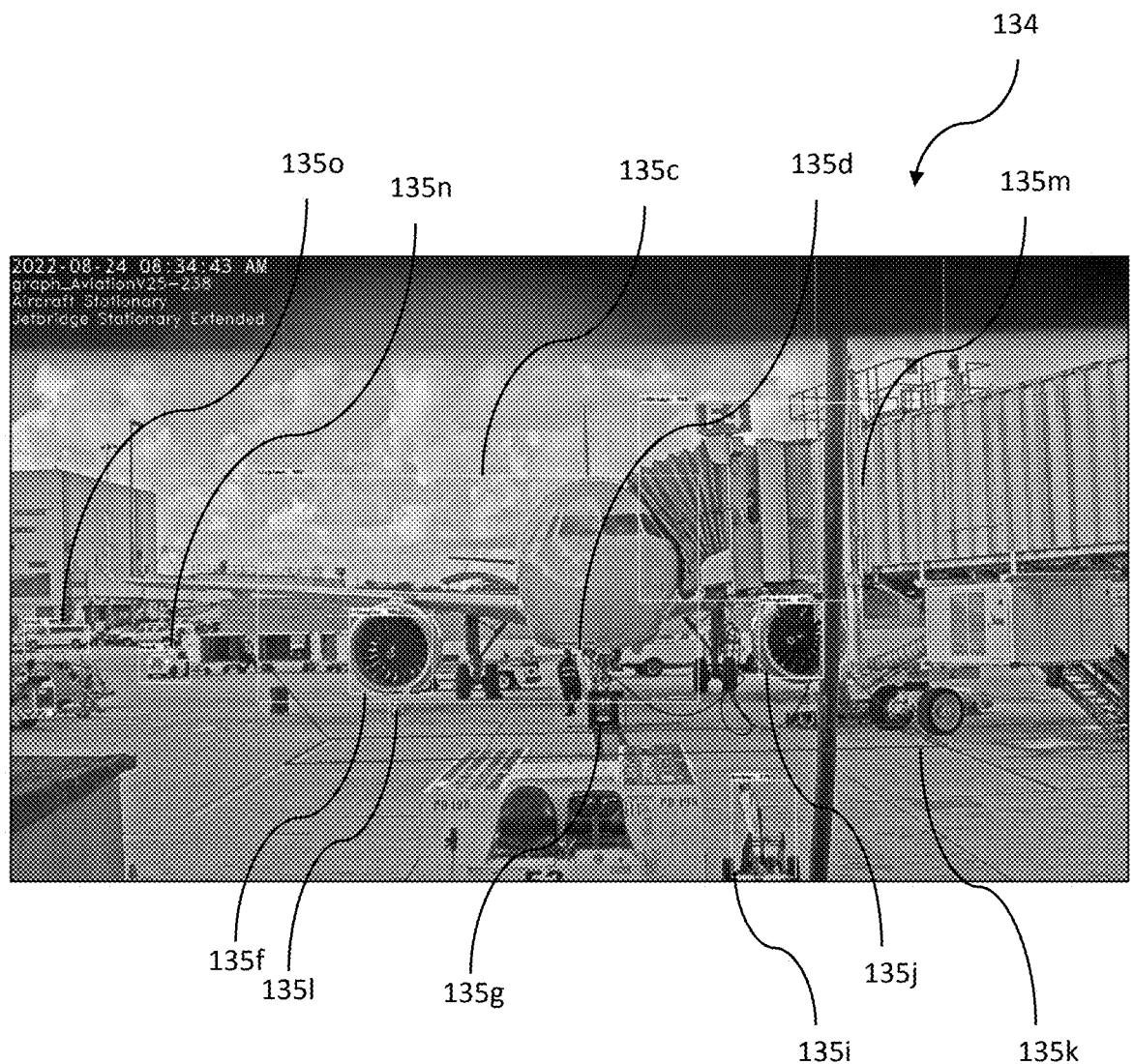
FIG. 8A is a screenshot of the video menu from the gate performance UI from the airport management system of FIG. 1.
Figure 8B:
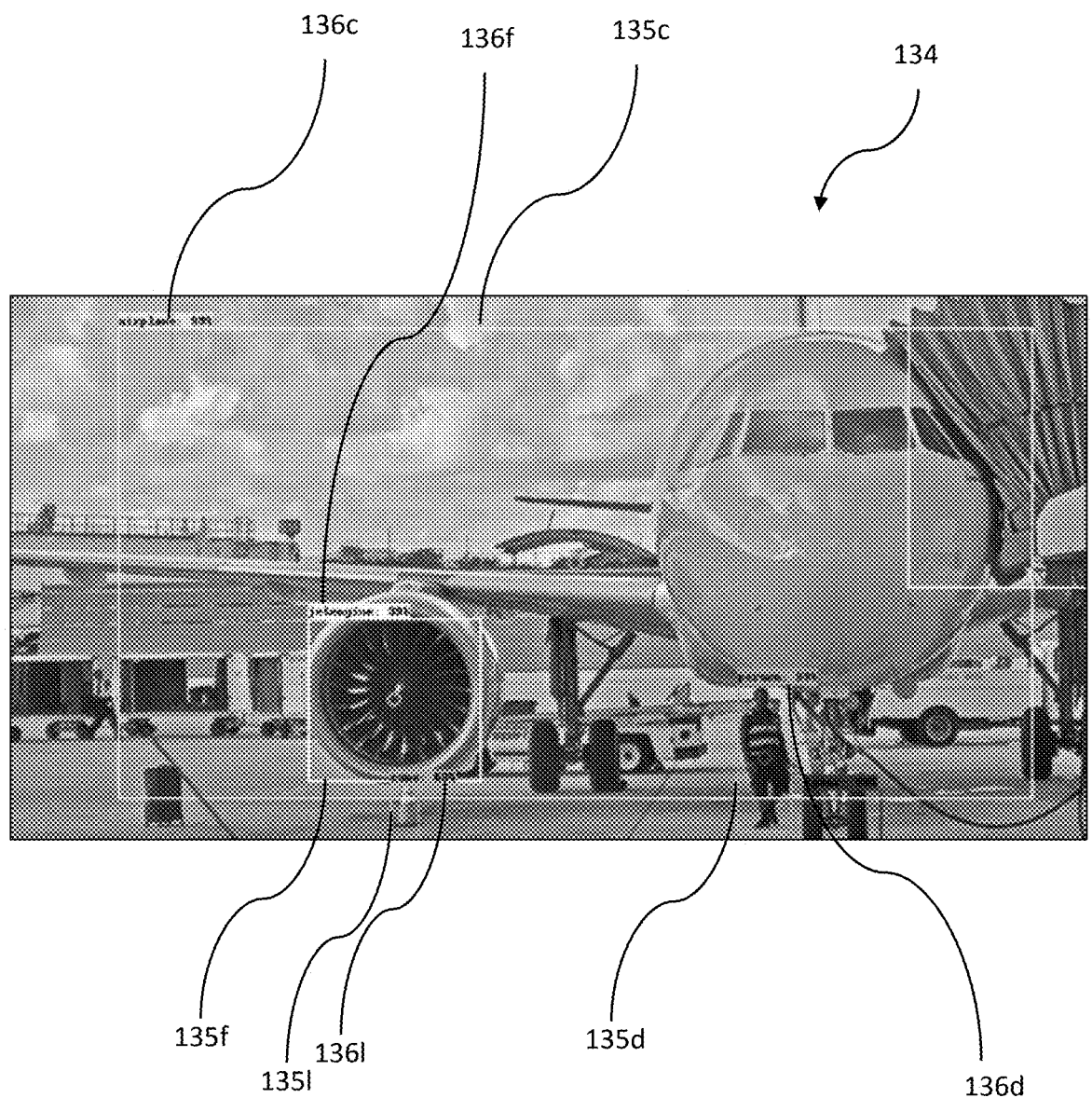
FIG. 8B is an enlarged screenshot of the video menu of FIG. 8A.

Referring now to FIG. 7, the gate performance UI 120 illustratively comprises a video menu 133 where the given detected apron event 127k comprises the push truck being in position. Referring now additionally to FIGS. 8A & 8B, which shows the video 134 of the given detected apron event 127k, the video menu 133 comprises a plurality of boundary boxes 135a-135k respectively over the detected plurality of objects 110a-110f.

Figure 9:
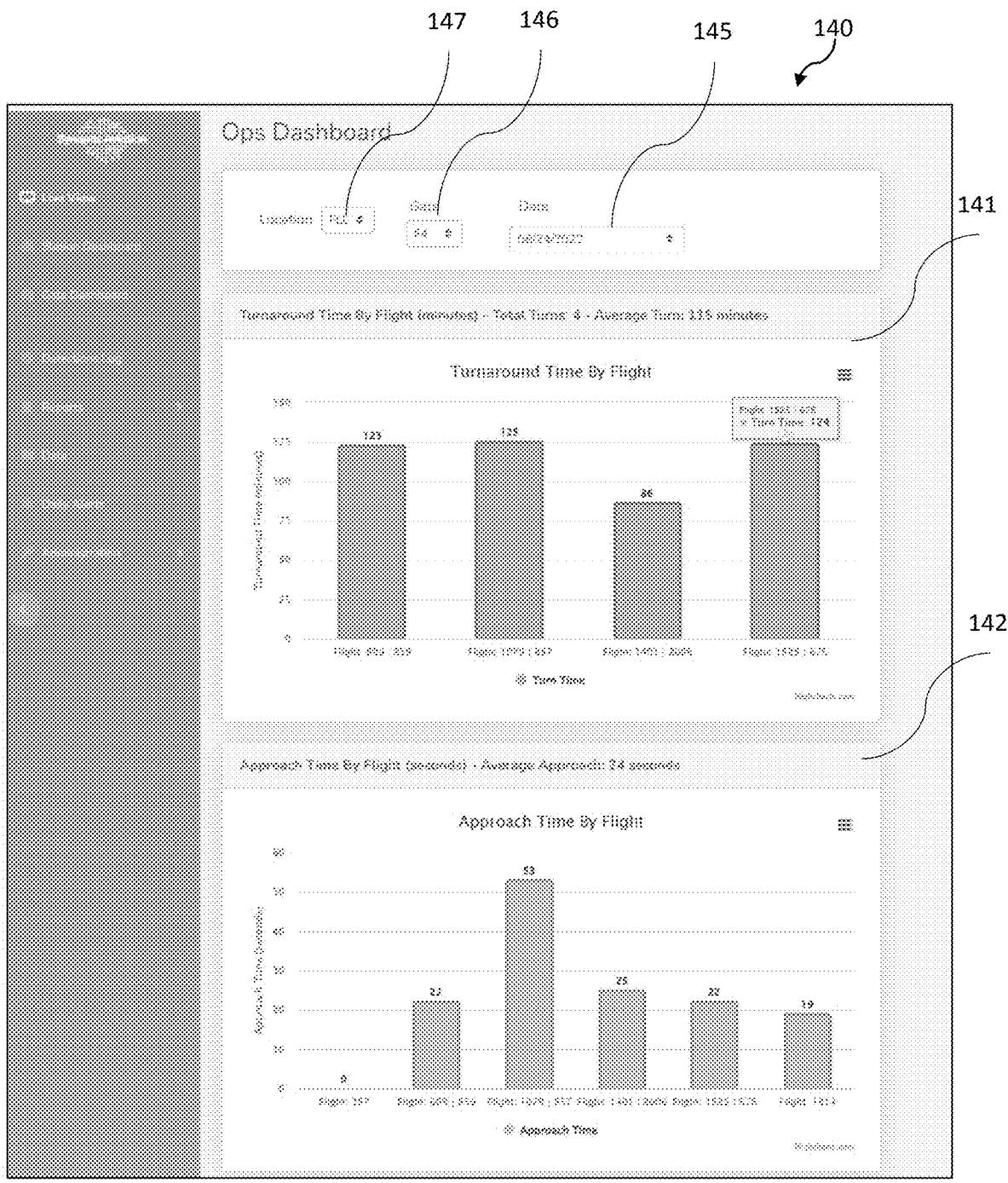
FIGS. 9-10 are screenshots of an operations dashboard UI from the airport management system of FIG. 1.
Figure 10:
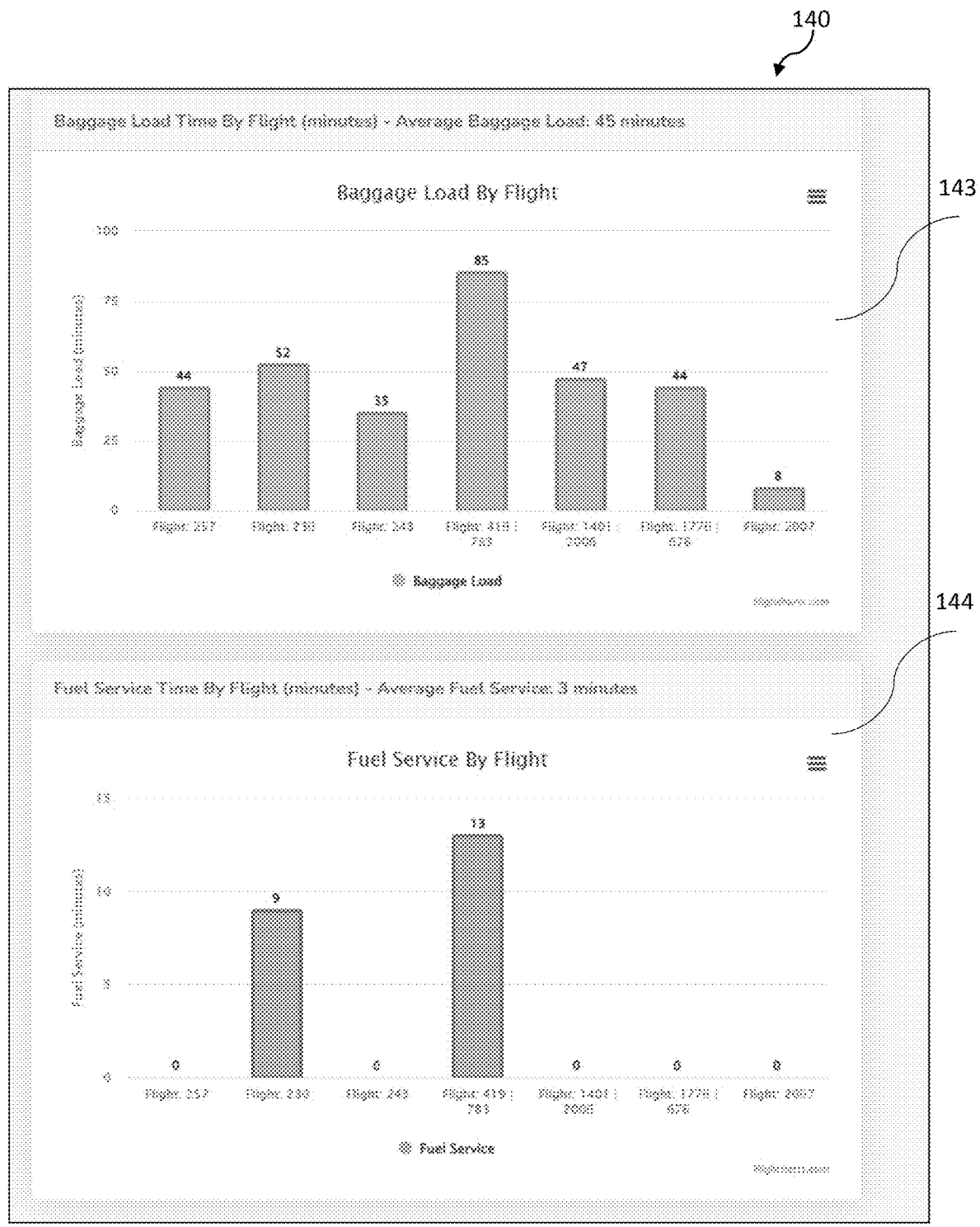
Figure 11A:
Figure 11B:
Figure 11C:
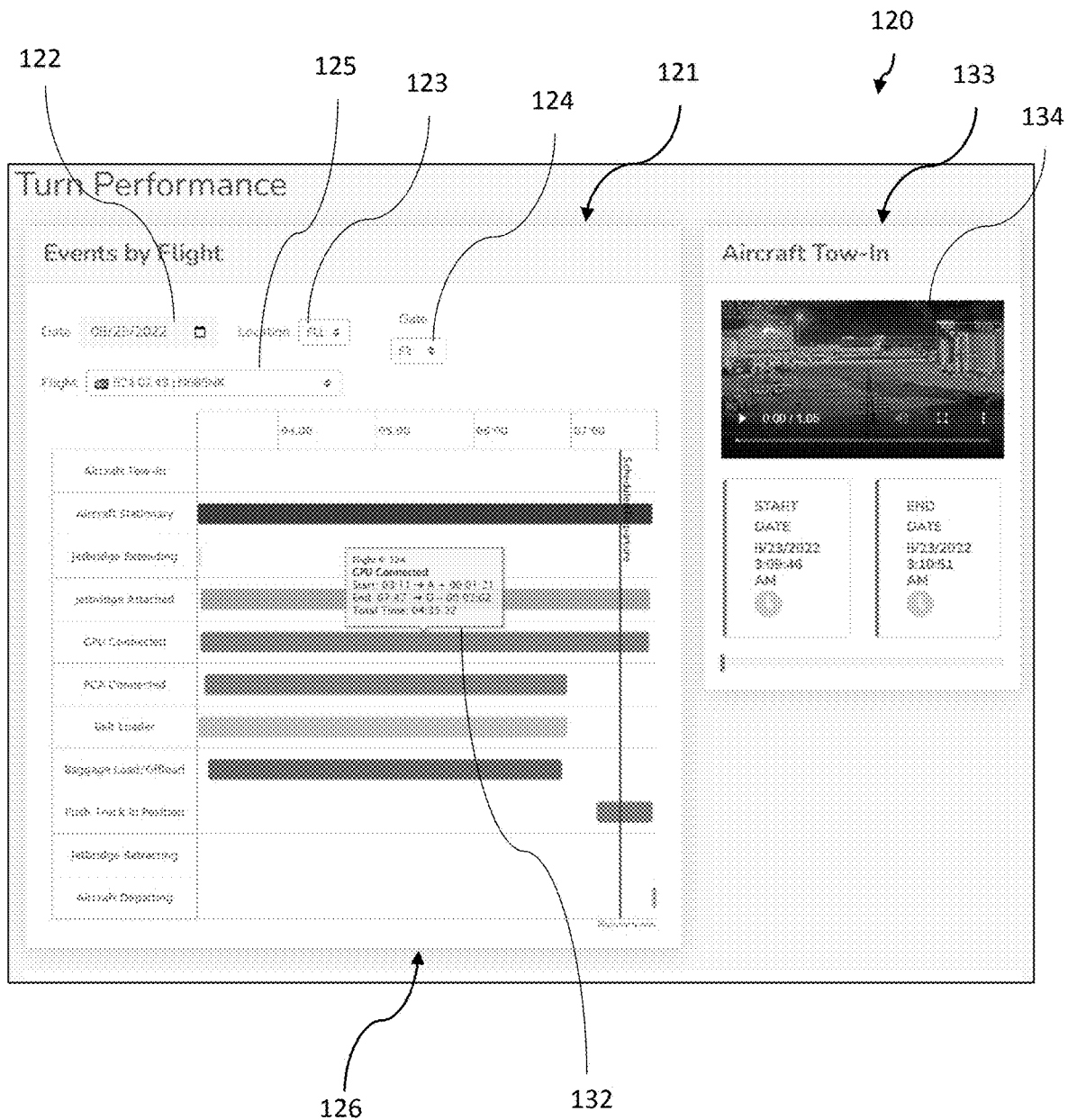
Figure 11D:
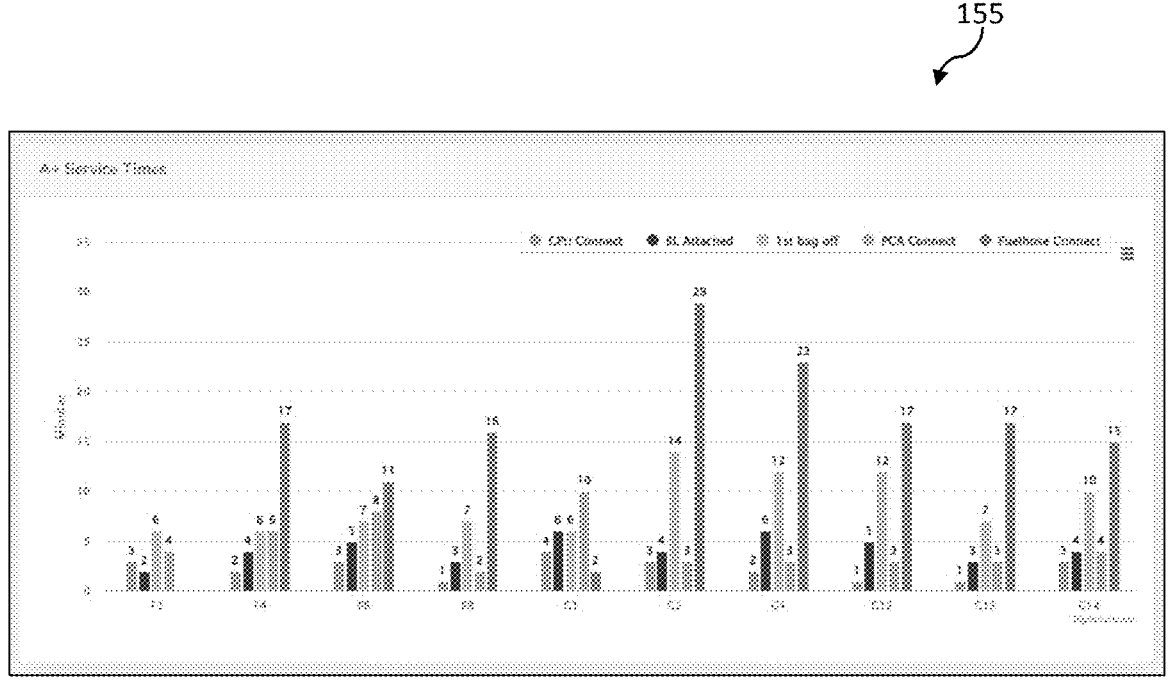

Referring now additionally to FIGS. 9-10, the server 103 is configured to generate an operations dashboard UI 140. The operations dashboard UI 140 illustratively comprises a turnaround time by flight chart 141, an approach time by flight chart 142, a baggage load time by flight chart 143, and a fuel service time by flight chart 144. The operations dashboard UI 140 illustratively includes a date fly down menu 145 for selecting a date for the performance statistics, a gate fly down menu 146 for selecting a gate, and a location fly down menu 147 for selecting an airport.

Referring now additionally to FIGS. 11A-11E, the server 103 is configured to generate an airport performance UI 150 for viewing the detected plurality of objects 110a-110f and the detected plurality of apron events 127a-127m for the plurality of gates 102a-102d. The airport performance UI 150 illustratively comprises a gate performance menu 151 comprising, for each gate 102a-102d, a number of flights, a number of delayed flights, a number and a length of air traffic holdouts, a number of early arrivals, a passenger loading bridge extension delay, and a gate utilization metric. The airport performance UI 150 comprises a latest video menu 152 showing the latest processed image data from the plurality of image sensors 104a-104d. The airport performance UI 150 further comprises a dashboard menu 153 comprising a number of flights for the airport, an average turn time for the airport, a gate utilization metric, and an on-time arrival metric. When one of the plurality of gates 102a-102d is selected from the gate performance menu 151, the server 103 is configured to generate the airport performance UI 150 to comprise a flight menu 154 showing the flights departing from the selected gate (e.g. the selected F2). Also, as perhaps best seen in FIG. 11C, when one of the flights is selected from the flight menu 154, the server 103 is configured to transition to the gate performance UI 120 for the selected gate and flight.

The airport performance UI 150 illustratively comprises an event performance menu 155 comprising average time durations for each type of detected apron events 127a-127m. The airport performance UI 150 comprises a compliance menu 156 comprising compliance metrics for a plurality of user-defined safety rules for the plurality of gates 102a-102d. The plurality of user-defined safety rules may comprise Pre-FOD walk completion, the jet way being clear of the safety envelope, and placement of safety cones.

Figure 12:
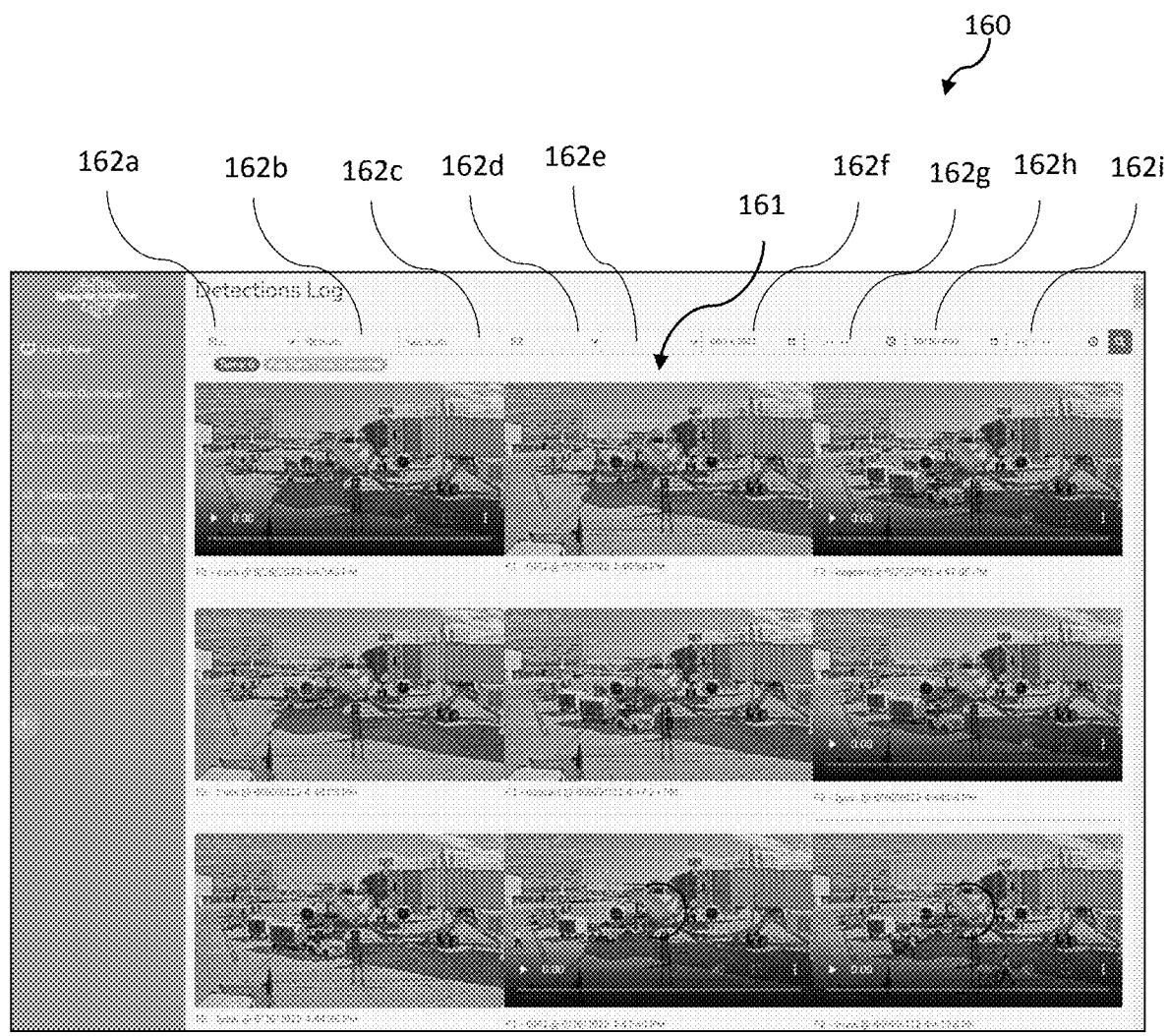
FIG. 12 is a screenshot of a detection log UI from the airport management system of FIG. 1.

Referring now additionally to FIG. 12, the server 103 is configured to generate a detection log UI 160 comprising a mosaic interface 161 for viewing recorded videos from the plurality of image sensors 104a-104d. For each video within the mosaic interface 161, the mosaic interface also includes a time stamp and apron event classification. Also, the detection log UI 160 illustratively comprises a plurality of filter fly down menus 162a-162i for selecting filter values for videos within the mosaic interface 161.

Figure 13A:
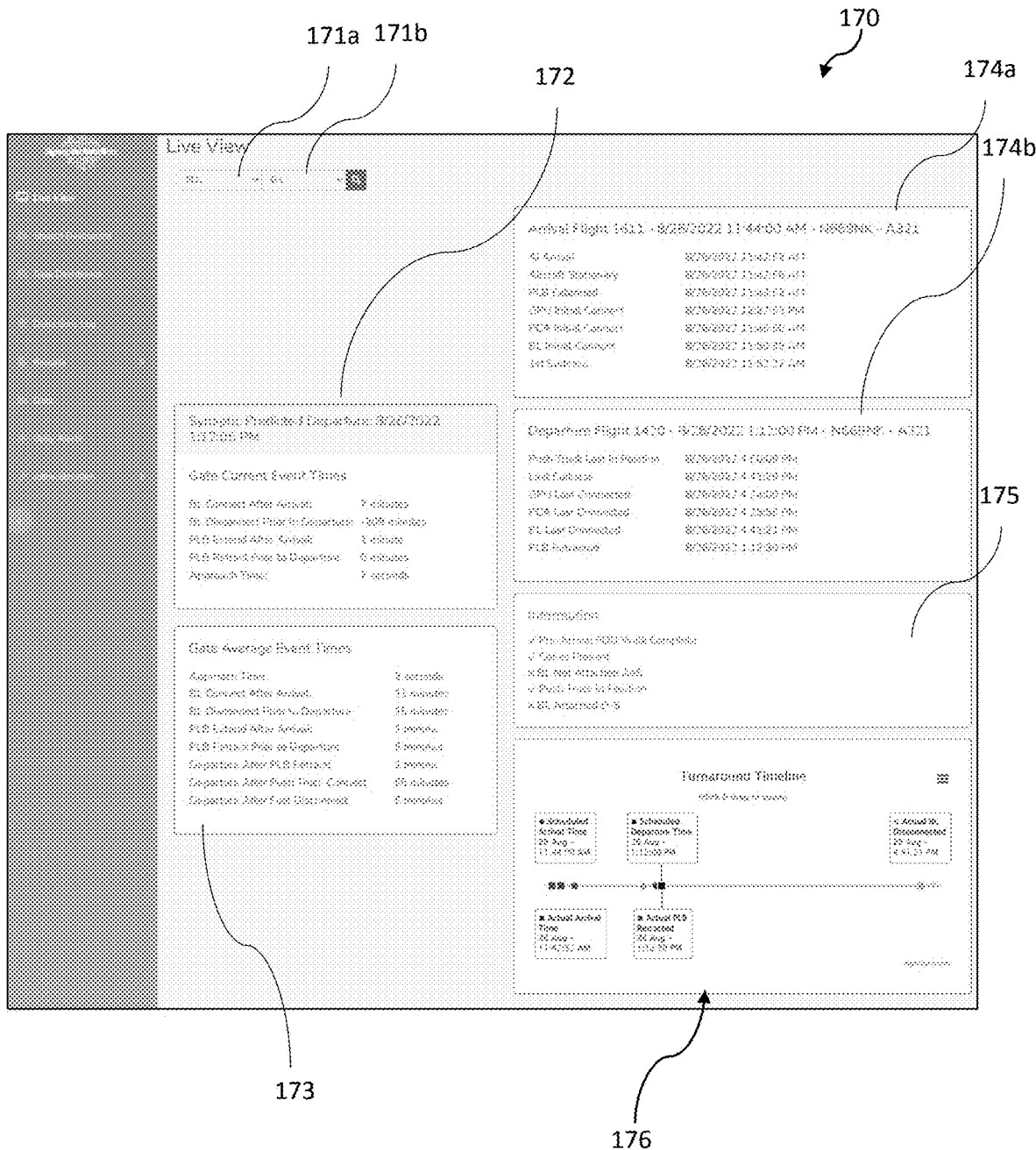
FIGS. 13A-13B are screenshots of a live view UI from the airport management system of FIG. 1, according to a first embodiment.
Figure 13B:
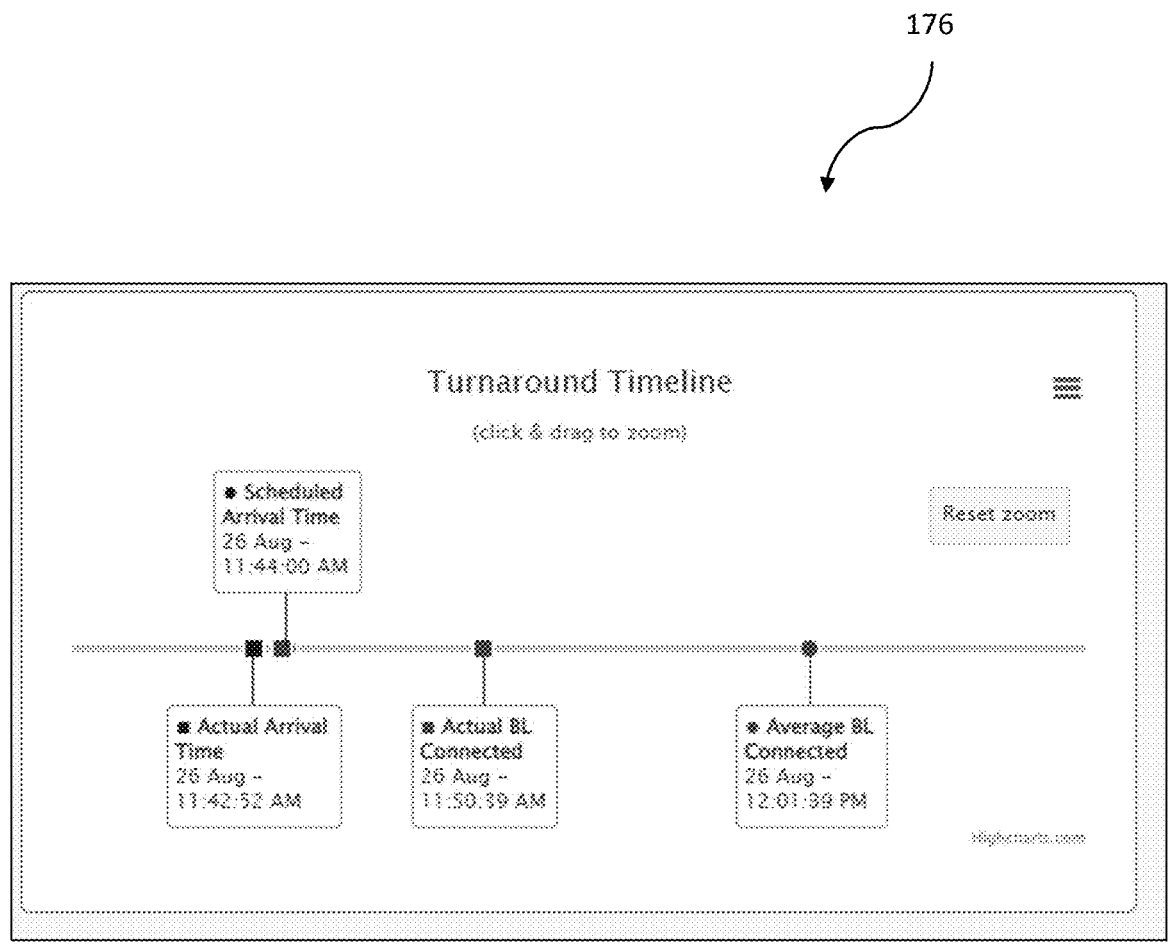

Referring now additionally to FIGS. 13A-13B, the server 103 is configured to generate a live view UI 170. The live view UI 170 illustratively comprises a location fly down menu 171*a* for selecting an airport, and a gate fly down menu 171*b* for selecting a gate. Once the airport and gate are selected, the server 103 is configured to generate the live view UI 170 to comprise a predicted departure menu 172 for a current flight with current event times, a gate average performance menu 173 showing the average time duration for the gate, and past flight menus 174*a*-174*b* showing the time stamps for apron events of past flights at the selected gate.

In some embodiments, the live view UI 170 may include a predicted off block time (POBT) provided for each flight. This POBT time value predicts the time of departure based upon past performance at the respective gate. The machine learning model takes into account that the time of turnaround activities (e.g. fueling) and passenger movement have a strong correlation with departure time. More so, in embodiments with an image sensor in the jet way, the live view UI 170 may include automatic boarding updating.

The live view UI 170 illustratively comprises a compliance menu 175 showing safety rule compliance for the current flight, and a turnaround timeline menu 176. As perhaps best seen in FIG. 13B, the turnaround timeline menu 176 includes a time line with scheduled and actual arrival of the current flight, and other apron events 127*a*-127*m*, including marks for average duration of certain apron events. For example, in the illustrated example, the actual time of the when the baggage loader was connected is marked in overlay with the average time duration for connection of the baggage loader. Helpfully, the turnaround timeline menu 176 shows that the ground crew performance at the gate is above average for this flight.

Figure 13C:
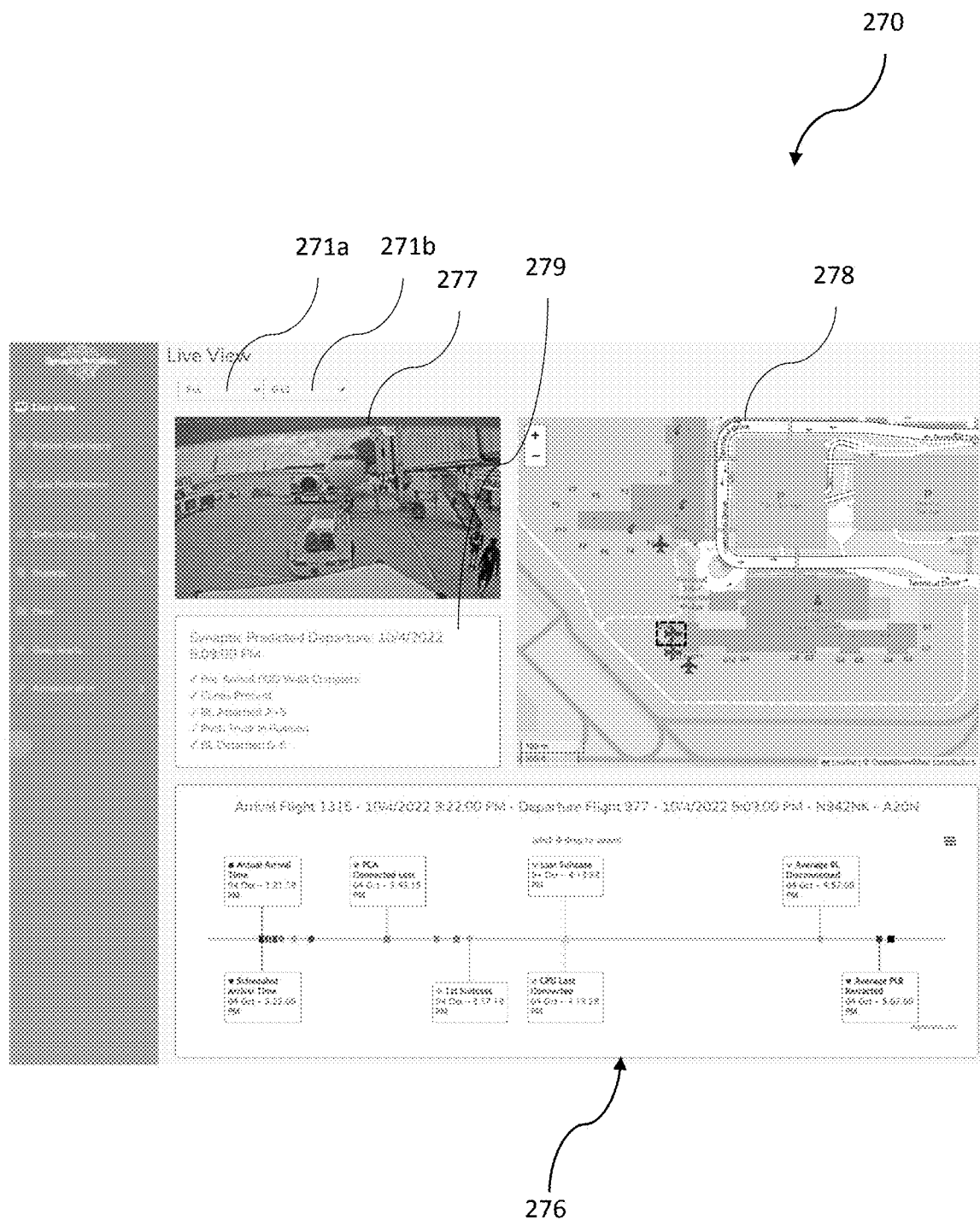
FIGS. 13C-13D are screenshots of the live view UI from the airport management system of FIG. 1, according to a second embodiment.

Referring now to FIG. 13C, another embodiment of the live view UI 270 is shown. This live view UI 270 illustratively includes a live video 277 of the selected gate, and a map menu 278 showing the location of aircraft at the airport 100. The live view UI 270 includes a predicted departure time menu 279. As will be appreciated, the predicted departure time is based upon the machine learning model and past performance the selected gate. The departure time menu 279 also includes a list of recent detected events, for example, the illustrated pre-arrival FOD walk, the placement of safety cones, the baggage loader being attached and detached, and the push-truck being in position.

Figure 13D:
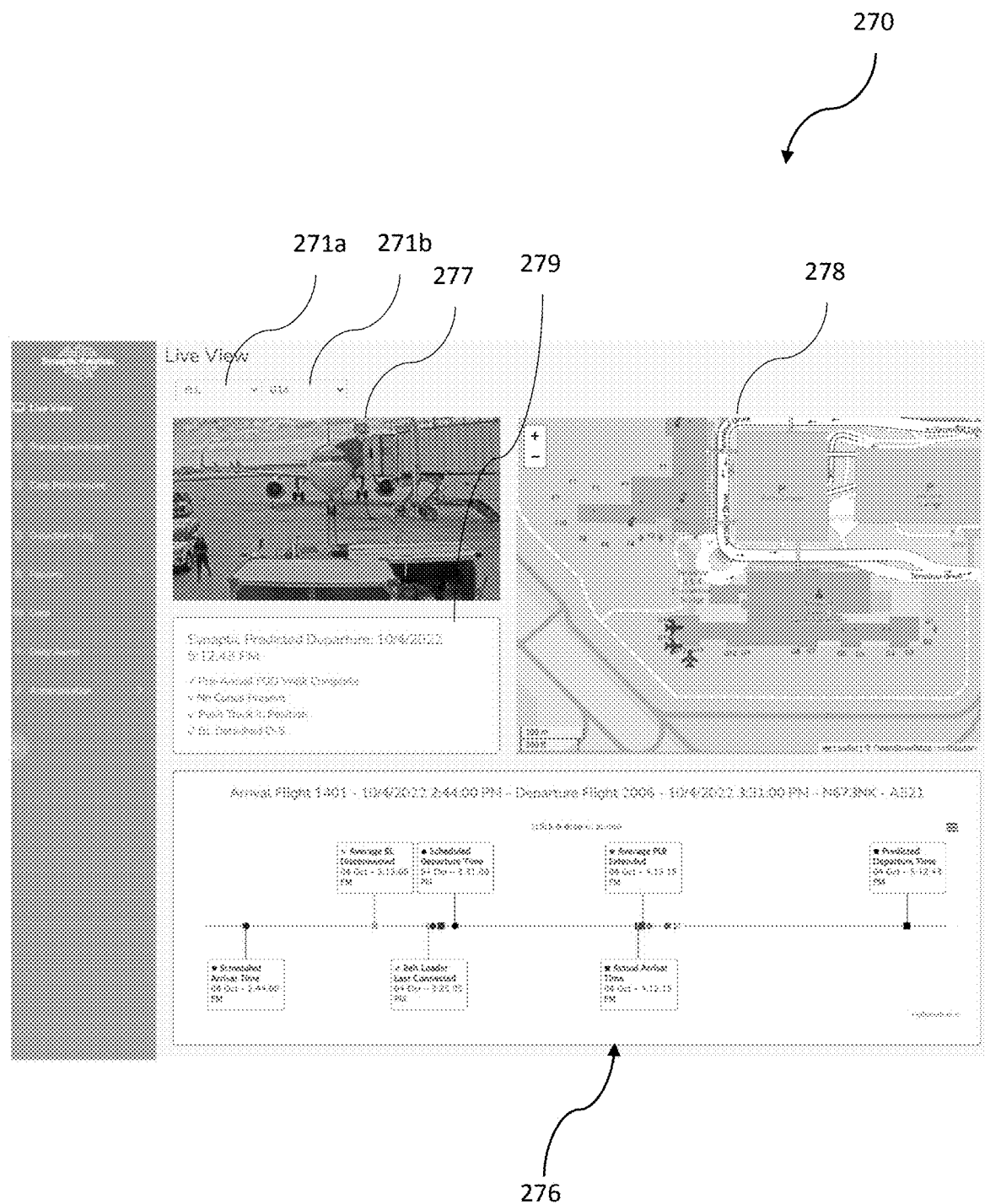

In the map menu 278, one or more gates with flagged safety/on-time issues may be color coded red. In the illustrated example, the gate G14 is flagged with the dashed box. Upon selecting the flagged gate, the live view UI 270 transitions to the flagged gate (i.e. G14), shown in FIG. 13D, which shows that the safety cones were not placed for the current flight in the predicted departure time menu 279. The map menu 278 may flag a gate 102*a*-102*d*, for example, when a safety condition is violated (e.g. the safety cones not being placed), or when a delay condition has occurred (i.e. flights estimated to depart late). Indeed, the server 103 may be configured to flag gates 102*a*-102*d* based upon any known metric.

Furthermore, the map menu 278 illustratively includes personnel icons at gates G13 and G14. The personnel icons indicate that the airport management system 100 has detected support personnel at the gate. As shown in the live video 277 of gate G13, there are personnel present at the gate.

Figure 14:
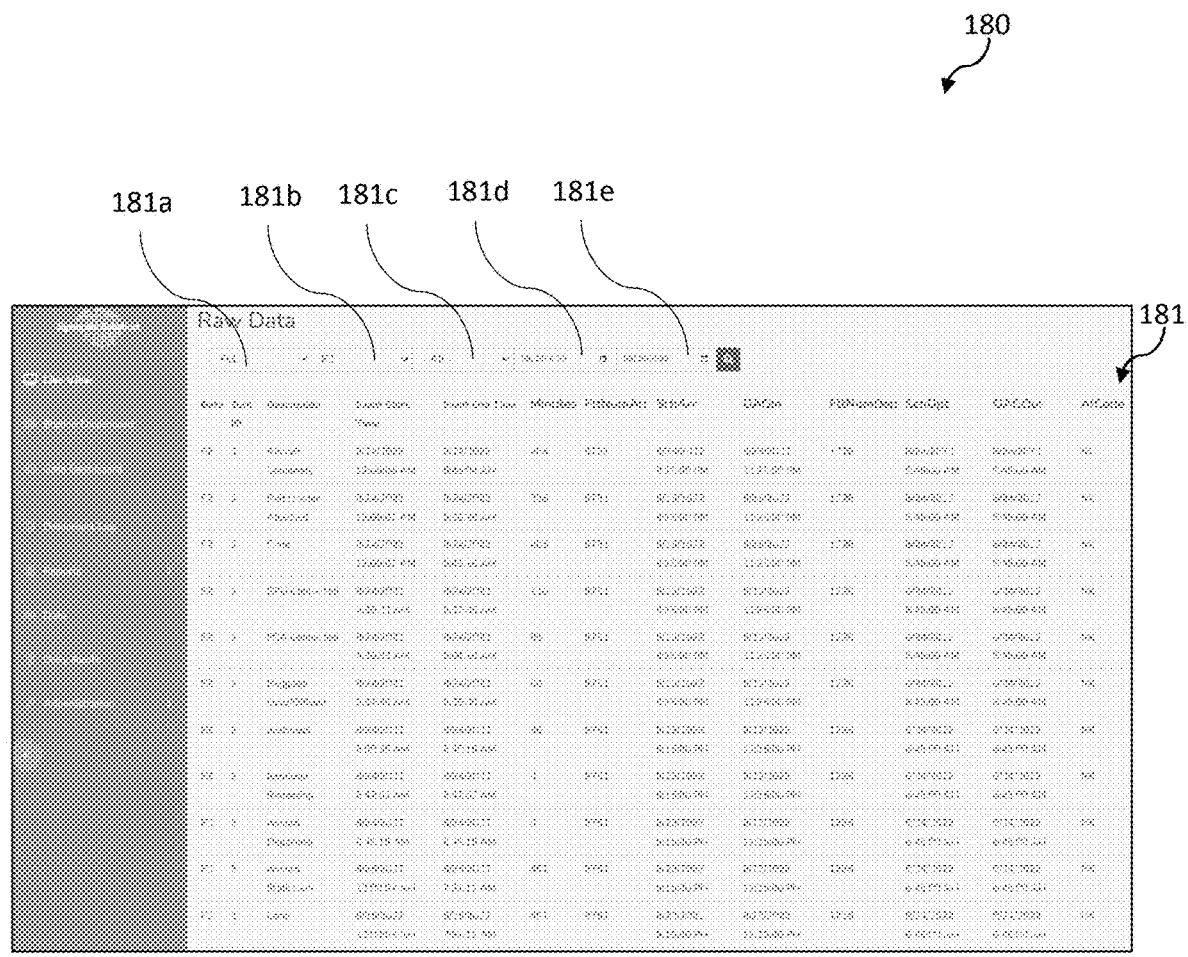
FIG. 14 is a screenshot of a raw data UI from the airport management system of FIG. 1.

Referring now additionally to FIG. 14, the server 103 is configured to generate a raw data UI 180 comprising a table listing 181 of the received videos. Also, the raw data UI 180 illustratively comprises a plurality of filter fly down menus 182*a*-182*e* for selecting filter values for videos within the table listing 181.

Figure 15:
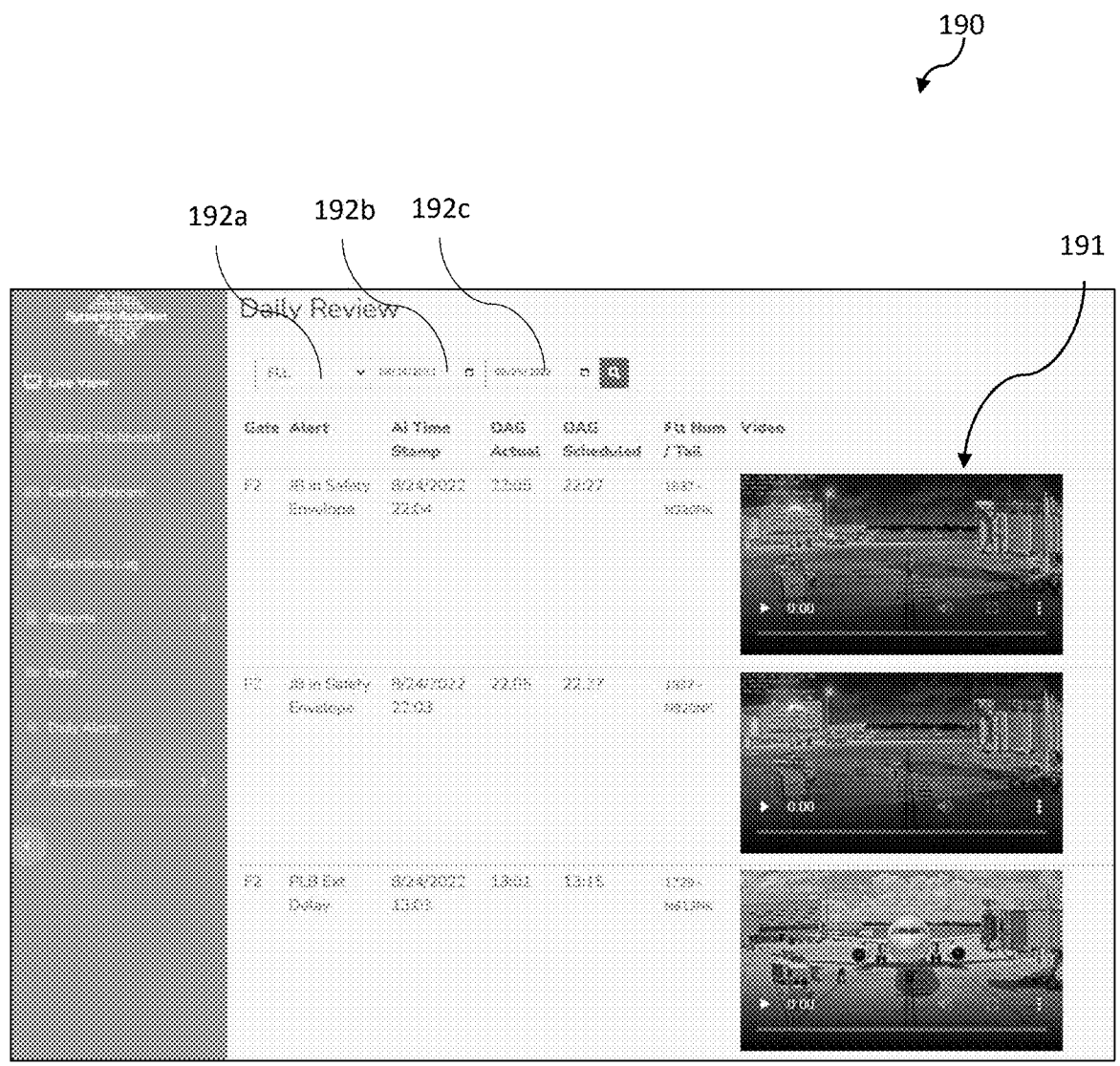
FIG. 15 is a screenshot of a daily alert UI from the airport management system of FIG. 1.

Referring now additionally to FIG. 15, the server 103 is configured to generate a daily alert UI 190 comprising an alert menu 191 of the received videos. In the illustrated embodiment, the alert menu 191 includes apron events 127*a*-127*m* including safety envelope violations, and delays in support equipment connection, but it also may include other events of interest, such as aircraft idling. Also, the daily alert UI 190 illustratively comprises a plurality of filter fly down menus 192*a*-192*c* for selecting filter values for videos within the alert menu 191. In some embodiments, the airport management system 100 may include a monitor and associated output indicator (e.g. audio speaker) configured to display the live view UI 170, 270 for each gate in a grid arrangement. When any gate creates an alert condition, the server 103 is configured to cause the output indicator to generate an alert indication (e.g. audio alert).

Another aspect is directed to a method for management of an airport 101 with a plurality of gates 102*a*-102*d*. The method comprises operating a plurality of image sensors 104*a*-104*d* respectively at the plurality of gates 102*a*-102*d*, each image sensor configured to generate image data for an apron 107*a*-107*d* of a respective gate. The method further includes operating a server 103 to receive the image data from each of the plurality of image sensors 104*a*-104*d*, detect a plurality of objects 110*a*-110*f* and a plurality of apron events 127*a*-127*m* associated therewith and within the apron 107*a*-107*d* of the respective gate 102*a*-102*d* based upon a machine learning model, and generate a gate performance UI 120 for viewing the detected plurality of objects 110*a*-110*f* and the detected plurality of apron events. The gate performance UI 120 comprises a timeline menu 121 of the detected plurality of apron events 127*a*-127*m* for each respective gate 102*a*-102*d*.

Figure 17:
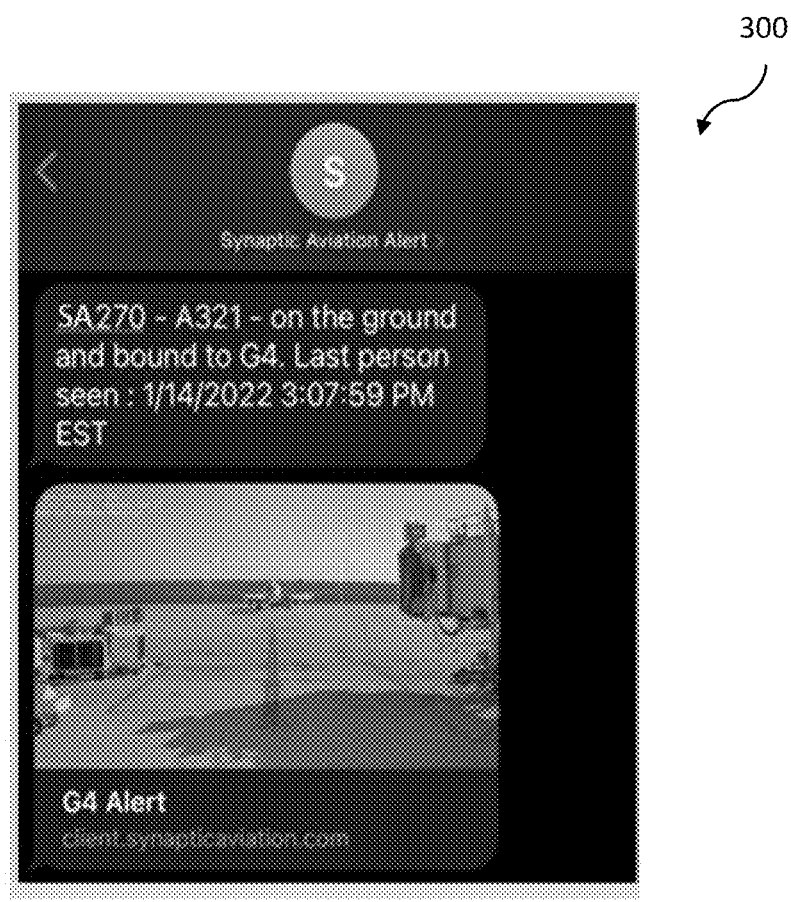
FIG. 17 is a screenshot of an alert message from the airport management system of FIG. 1.

In some embodiments (FIG. 17), the server 103 is configured to send one or more alert messages to the user based upon the received image data. In the illustrated example, the alert message 300 includes a description and screenshot of the associated video generating the alert condition. In these embodiments, the alert messages may be derived from the alert menu 191. For example, the alert messages may comprise an e-mail message, a SMS text message, or a push notification message on a mobile device (e.g. via a native software application in communication with the server 103). The server 103 may be configured to store one or more trigger rules for causing the transmission of the alert messages. In some embodiments, the alert messages may be sent when threshold performance metrics are exceeded, such as a set percentage of delayed flights, a set average turn time for the airport, or a set gate utilization metric. Also, the alert messages may be sent when safety rule compliance falls below a set threshold.

In some embodiments, the server 103 may render the above described UIs within a web browser. Of course, in other embodiments, the server 103 may operate in tandem with native software installed on work stations.

The airport management system 100 may provide an approach to the potential drawbacks of existing airport management systems. In particular, the airport management system 100 may provide for enhanced visibility with regards to ground operations at the airport 101. In particular, beyond performance metrics on delayed flights, the airport management system 100 may provide insight into specific ground functions that are causing delays at individual gates. More so, since the airport management system 100 is powered by a machine learning model, this data aggregation and characterization is done without onerous user interaction. The airport management system 100 may allow airline operators to determine which links in the support chain of their operations are causing delays.

Moreover, the airport management system 100 may provide for cost reductions by preventing unnecessary aircraft holdouts for gates that are not ready. As a consequence of reduced aircraft holdouts, the airport management system 100 may reduce greenhouse gas emissions. Moreover, beyond using the compliance metrics for encouraging personnel compliance with safety regulations, the airport management system 100 provides ample teaching videos for operators. Of course, this will promote improved safety for support personnel. Since all apron events 127a-127m are recorded, classified, and stored, the airport management system 100 may permit easy compliance with safety audits from regulatory authorities.

In some embodiments, the server 103 is configured to operate the machine learning model for additional training for customer specific equipment. Also, the apron 107a-107d (i.e. the safety envelope-proper position of an aircraft) may be customized based upon customer specific parameters.

In some embodiments, a customer may make customized changes to the machine leaning model of the server 103. In particular, when the airport management system 100 is deployed initially, the customer may need to annotate the safety envelope 107a-107d for each gate 102a-102d, and annotate the proper position of supporting equipment, such as the passenger loading bridge. Subsequently, the customer may need to update these customer defined parameters when equipment is changed, for example, when the image sensors 104a-104d are replaced or repositioned.

Figure 16:
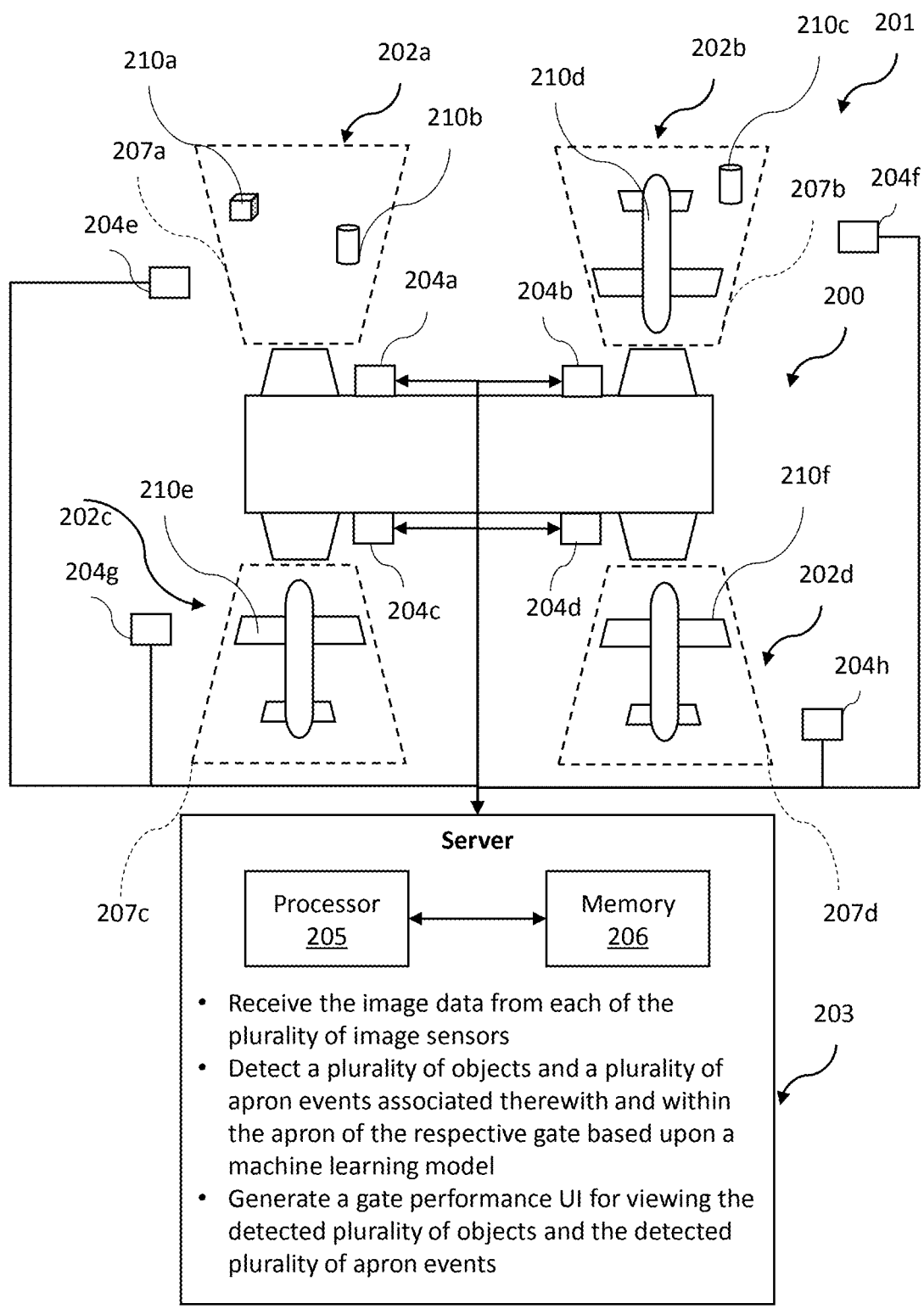
FIG. 16 is a schematic diagram of a second embodiment of the airport management system, according to the present disclosure.

Referring now additionally to FIG. 16, another embodiment of the airport management system 200 is now described. In this embodiment of the airport management system 200, those elements already discussed above with respect to FIGS. 1-15 are incremented by 100 and most require no further discussion herein. This embodiment differs from the previous embodiment in that this airport management system 200 illustratively includes each gate 202a-202d having multiple image sensors 204a-204h for provide multiple views of the apron 207a-207d and adjacent areas. Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. An airport management system for an airport with a plurality of gates, the airport management system comprising:
   a server; and
   a plurality of image sensors respectively at the plurality of gates, each image sensor configured to generate image data for an apron of a respective gate;
   the server configured to
     receive the image data from each of the plurality of image sensors,
     detect a plurality of objects and a plurality of apron events associated therewith and within the apron of the respective gate based upon a machine learning model,
     for each object, generate an object detection level of confidence value, an object identification, date/time values for acquisition, x-y coordinates of the object, and a size value of the object,
     generate a gate performance user interface (UI) for viewing the detected plurality of objects and the detected plurality of apron events, the gate performance UI comprising
       a timeline menu of the detected plurality of apron events for each respective gate,
       a video menu, and
       a context menu,
     when a given detected apron event is selected in the timeline menu, generate and display the video menu to comprise
       a video associated with the given detected apron event,
       a plurality of boundary boxes respectively displayed over the detected plurality of objects in the video associated with the given detected apron event, and
       respective object detection level of confidence values for each of the plurality of boundary boxes displayed with the detected plurality of objects, and
     when the given detected apron event is selected in the timeline menu, generate and display the context menu for the given detected apron event comprising a time duration for the given detected apron event, and start/end times for the given detected apron event.

2. The airport management system of claim 1 wherein the machine learning model is uniquely trained for each gate.

3. The airport management system of claim 1 wherein the timeline menu comprises a duration indicator for each of the detected plurality of apron events.

4. The airport management system of claim 1 wherein the server is configured to generate an airport performance UI for viewing the detected plurality of objects and the detected plurality of apron events for the plurality of gates, the airport performance UI comprising a gate performance menu comprising, for each gate, a number and a length of air traffic holdouts, a number of early arrivals, a passenger loading bridge extension delay, and a gate utilization metric.

5. The airport management system of claim 4 wherein the airport performance UI comprises a dashboard menu comprising a number of flights for the airport, an average turn time for the airport, a gate utilization metric, and an on-time arrival metric.

6. The airport management system of claim 4 wherein the airport performance UI comprises an event performance menu comprising average time durations for each type of detected apron events.

7. The airport management system of claim 4 wherein the airport performance UI comprises a compliance menu comprising compliance metrics for a plurality of user-defined safety rules for the plurality of gates.

8. The airport management system of claim 1 wherein the detected plurality of apron events comprises a Foreign Object Debris (FOD) walk, a ground power unit connection, a fuel hose connection, a belt loader connection, a passenger loading bridge connection, and a cargo event.

9. The airport management system of claim 1 wherein each gate has a single image sensor configured to generate the image data.

10. The airport management system of claim 1 wherein each gate has a plurality of image sensors configured to generate the image data.

11. An airport management system for an airport with a plurality of gates, the airport management system comprising:
   a server; and
   a plurality of image sensors respectively at the plurality of gates, each image sensor configured to generate image data for an apron of a respective gate;
   the server configured to
      receive the image data from each of the plurality of image sensors,
      detect a plurality of objects and a plurality of apron events associated therewith and within the apron of the respective gate based upon a machine learning model, the machine learning model being uniquely trained for each gate,
      for each object, generate an object detection level of confidence value, an object identification, date/time values for acquisition, x-y coordinates of the object, and a size value of the object,
      generate a gate performance user interface (UI) for viewing the detected plurality of objects and the detected plurality of apron events, the gate performance UI comprising
         a timeline menu of the detected plurality of apron events for each respective gate, the timeline menu comprising a duration indicator for each of the detected plurality of apron events,
         a video menu, and
         a context menu,
      when a given detected apron event is selected in the timeline menu, generate and display the video menu to comprise
         a video associated with the given detected apron event,
         a plurality of boundary boxes respectively displayed over the detected plurality of objects in the video associated with the given detected apron event, and
         respective object detection level of confidence values for each of the plurality of boundary boxes displayed with the detected plurality of objects, and
      when the given detected apron event is selected in the timeline menu, generate and display the context menu for the given detected apron event comprising a time duration for the given detected apron event, and start/end times for the given detected apron event.

12. The airport management system of claim 11 wherein the server is configured to generate an airport performance UI for viewing the detected plurality of objects and the detected plurality of apron events for the plurality of gates, the airport performance UI comprising a gate performance menu comprising, for each gate, a number and a length of air traffic holdouts, a number of early arrivals, a passenger loading bridge extension delay, and a gate utilization metric.

13. The airport management system of claim 12 wherein the airport performance UI comprises a dashboard menu comprising a number of flights for the airport, an average turn time for the airport, a gate utilization metric, and an on-time arrival metric.

14. The airport management system of claim 12 wherein the airport performance UI comprises an event performance menu comprising average time durations for each type of detected apron events.

15. The airport management system of claim 12 wherein the airport performance UI comprises a compliance menu comprising compliance metrics for a plurality of user-defined safety rules for the plurality of gates.

16. The airport management system of claim 11 wherein the detected plurality of apron events comprises a Foreign Object Debris (FOD) walk, a ground power unit connection, a fuel hose connection, a belt loader connection, a passenger loading bridge connection, and a cargo event.

17. The airport management system of claim 11 wherein each gate has a single image sensor configured to generate the image data.

18. A method for management of an airport with a plurality of gates, the method comprising:
   operating a plurality of image sensors respectively at the plurality of gates, each image sensor configured to generate image data for an apron of a respective gate; and
   operating a server to
      receive the image data from each of the plurality of image sensors,
      detect a plurality of objects and a plurality of apron events associated therewith and within the apron of the respective gate based upon a machine learning model,
      for each object, generate an object detection level of confidence value, an object identification, date/time values for acquisition, x-y coordinates of the object, and a size value of the object,
      generate a gate performance user interface (UI) for viewing the detected plurality of objects and the detected plurality of apron events, the gate performance UI comprising
         a timeline menu of the detected plurality of apron events for each respective gate,
         a video menu, and
         a context menu, and
      when a given detected apron event is selected in the timeline menu, generate and display the video menu to comprise
         a video associated with the given detected apron event,
         a plurality of boundary boxes respectively displayed over the detected plurality of objects in the video associated with the given detected apron event, and
         respective object detection level of confidence values for each of the plurality of boundary boxes displayed with the detected plurality of objects, and
      when the given detected apron event is selected in the timeline menu, generate and display the context menu for the given detected apron event comprising a time duration for the given detected apron event, and start/end times for the given detected apron event.

19. The method of claim 18 wherein the machine learning model is uniquely trained for each gate.

20. The method of claim 18 wherein the timeline menu comprises a duration indicator for each of the detected plurality of apron events.

* * * * *